United States Patent
Otani et al.

[11] Patent Number: 5,995,228
[45] Date of Patent: Nov. 30, 1999

[54] WAVELENGTH DISPERSION MEASURING APPARATUS AND POLARIZATION DISPERSION MEASURING APPARATUS

[75] Inventors: Akihito Otani; Toshinobu Otsubo, both of Atsugi; Hidehiko Takara, Yokosuka; Satoki Kawanishi, Zushi; Yoshiaki Yamabayashi, Yokohama, all of Japan

[73] Assignees: Anritsu Corporation; Nippon Telegraph and Telephone Corporation, both of Tokyo, JPX

[21] Appl. No.: 09/250,089

[22] Filed: Feb. 16, 1999

[30] Foreign Application Priority Data

Feb. 20, 1998 [JP] Japan .................................. 10-039099

[51] Int. Cl.$^6$ ...................................................... G01J 4/04
[52] U.S. Cl. ............................................ 356/364; 356/73.1
[58] Field of Search ...................................... 356/364, 365, 356/366, 367, 368, 73.1, 345, 351; 385/27, 24, 147; 250/225

[56] References Cited

U.S. PATENT DOCUMENTS

| | | | |
|---|---|---|---|
| 5,227,623 | 7/1993 | Heffner | 250/225 |
| 5,390,018 | 2/1995 | Fujita et al. | 356/73.1 |
| 5,406,368 | 4/1995 | Horiuchi et al. | 356/73.1 |
| 5,654,793 | 8/1997 | Barlow et al. | 356/73.1 |
| 5,717,489 | 2/1998 | Ozeki et al. | 356/364 |

FOREIGN PATENT DOCUMENTS

04-177141  6/1992  Japan .
06-174592  6/1994  Japan .

OTHER PUBLICATIONS

Patent Abstracts of Japan, Publication No. JP 04–177141, Published Jun. 24, 1992, Nippon Telegraph & Telephone Corp.

Patent Abstracts of Japan, Publication No. JP 06–174592, Published Jun. 24, 1994, Nippon Telephone & Telegraph Corp.

*Primary Examiner*—Hoa Q. Pham
*Attorney, Agent, or Firm*—Frishauf, Holtz, Goodman, Langer & Chick, P.C.

[57] ABSTRACT

A first tunable wavelength pulse light source is driven by a reference signal to emit a first optical pulse. An optical demultiplexer demultiplexes a first optical pulse emitted from the first pulse light source into a reference optical pulse and an incident optical pulse to be sent into an object to be measured. An optical multiplexer multiplexes the reference optical pulse and an outgoing optical pulse passing through the object to output multiplexed light. A second pulse light source generates a second optical pulse which is synchronous with the first optical pulse and delays a predetermined time for each period of the first optical pulse. A sampling unit receives the multiplexed light and the second optical pulse to obtain an optical pulse train signal proportional to the intensity of the multiplexed light obtained in synchronism with the second optical pulse. From the optical pulse train signal from the sampling unit, a signal processor obtains an envelope formed by peaks of individual optical pulses forming the optical pulse train. The wavelength dispersion of the object is obtained by measuring the delay time of the outgoing optical pulse passing through the object on the basis of intervals between the peaks of the envelope.

11 Claims, 11 Drawing Sheets

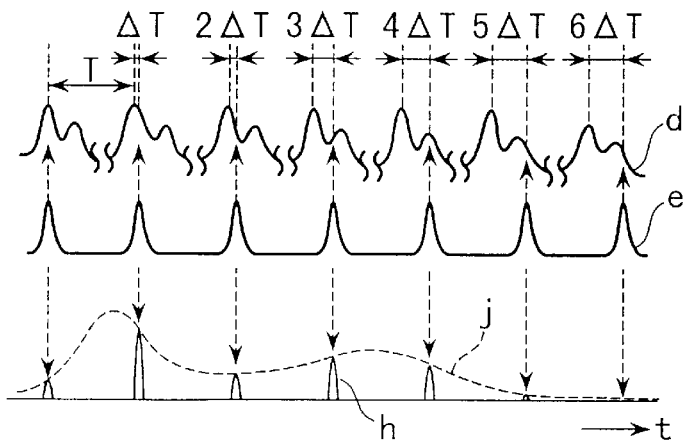
FIG. 4A MULTIPLEXED LIGHT WAVEFORM (fHz)
FIG. 4B SAMPLING OPTICAL PULSE (f−ΔfHz)
FIG. 4C SUM FREQUENCY LIGHT (CROSS-CORRELATION SIGNAL WAVEFORM) (ΔfHz)
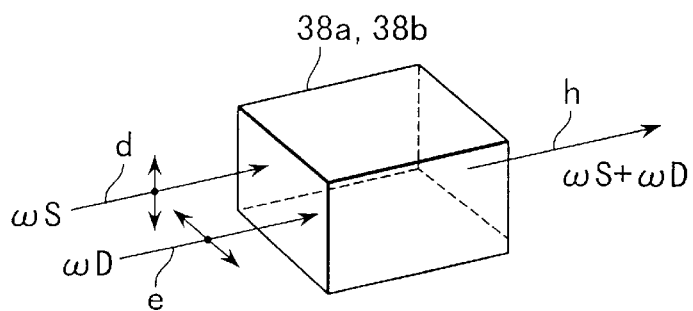
FIG. 5A
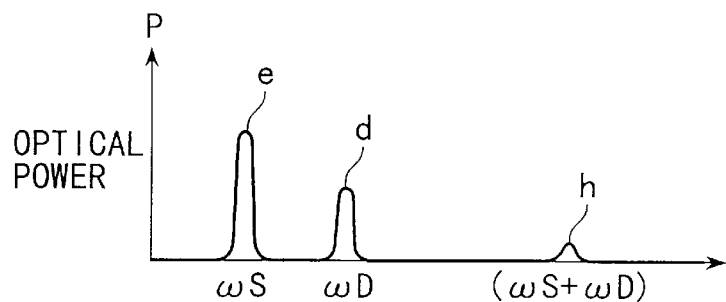
FIG. 5B

WAVELENGTH DISPERSION MEASURING APPARATUS AND POLARIZATION DISPERSION MEASURING APPARATUS

BACKGROUND OF THE INVENTION

The present invention relates to a wavelength dispersion measuring apparatus and polarization dispersion measuring apparatus and, more particularly, to a wavelength dispersion measuring apparatus for measuring wavelength dispersion occurring when light passes through an object to be measured such as an optical fiber and a polarization dispersion measuring apparatus for measuring polarization dispersion occurring when light passes through an object to be measured.

For example, the speed at which an optical signal propagates in an optical fiber changes in accordance with the wavelength of the optical signal.

Accordingly, the pulse width (time width) of the pulse waveform in an output optical pulse signal from a light source having a wavelength spread extends in an optical fiber.

Since the transmission band of an optical fiber is inversely proportional to pulse width, this transmission band has influence on limitations on the transmission speed of an optical signal.

Hence, measuring the transmission speed (wavelength dispersion) in an optical fiber for each wavelength is a crucial performance testing item for the optical fiber.

In particular, a very high-speed optical signal faster than 100 Gbit/s, which is to be used in a next-generation large-capacity optical network, has a narrow optical signal pulse width of a few ps, i.e., has a large wavelength spread. Therefore, the wavelength dispersion of an optical fiber has large influence on optical transmission.

Also, in the pulse generation technologies the wavelength dispersion of an optical fiber has large influence on the generation ratio of high-quality pulses, i.e., transform-limited optical pulses. So, the wavelength dispersion measurement is becoming a more important item.

As methods of measuring the wavelength dispersion, (a) time resolved spectroscopy, (b) pulse method, (c) interference method, (d) differential method, (e) phase difference method, and the like have been proposed.

Of these methods (a) to (e), a pulse method proposed in Jpn. Pat. Appln. KOKAI Publication No. 6-174592 and comparatively frequently practiced will be described below with reference to FIG. 13.

The wavelength of an output white pulse with a broad wavelength range coming from a white pulse light source 1 is limited to a specific wavelength by a variable wavelength optical band-pass filter 2. After that, an optical demultiplexer 3 demultiplexes this white pulse into an incoming optical pulse 4 and a reference optical pulse 5.

The incident optical pulse 4 enters a fiber 6 to be measured and then enters one input of an optical multiplexer 7 through the fiber 6.

The reference optical pulse 5 directly enters the other input of the optical multiplexer 7.

The optical multiplexer 7 multiplexes the incident optical pulse and the reference optical pulse 5 and inputs a multiplexed optical signal 8 to a delay time detecting means 9.

From this multiplexed optical signal 8, the delay time detecting means 9 calculates a delay time $t_D$ of the incident optical pulse with respect to the reference optical pulse 5.

That is, the incident optical pulse 4 produces a time delay by passing through the fiber 6. Therefore, multiplexing this incident optical pulse 4 and the reference optical pulse 5 having no time delay produces two peaks in the signal waveform of the multiplexed optical signal 8.

The time difference between these two peaks is the delay time $t_D$.

While, therefore, a wavelength $\lambda$ of light passing through the tunable wavelength optical band-pass filter 2 is changed, a delay time $t_D(\lambda)$ at each wavelength $\lambda$ is measured.

The wavelength dependence of this delay time $t_D(\lambda)$ is the wavelength dispersion characteristic.

Next, a pulse method proposed in Jpn. Pat. Appln. KOKAI Publication No. 4-177141 will be described below with reference to FIG. 14.

An output optical pulse from an ultrashort pulse generator 11 passes through an optical fiber 12 to be measured and is demultiplexed into two optical pulses A and B by an optical demultiplexer 13.

A tunable wavelength band-pass filter 14 passes only a specific wavelength of the optical pulse A to form a first optical pulse.

The optical pulse B passes through a delay line 15 to form a second optical pulse.

An optical multiplexer 16 multiplexes the first and second optical pulses, and a photodetector 17 converts the multiplexed pulse into an electrical signal. A pulse waveform measuring device 18 measures the relative delay time difference between the first and second optical pulses as a function of wavelength. Consequently, the wavelength dependence of delay time described above is obtained.

Another important characteristic of an optical communication medium such as an optical fiber is the polarization dispersion characteristic.

That is, in an optical fiber having an ideal truly circular sectional shape, the transmission speed of an optical pulse signal propagating in this optical fiber does not change regardless of the direction of this optical pulse signal in a fiber section.

If, however, the sectional shape of optical fiber is an ellipse rather than a true circle or the optical fiber is bent to partially flatten the sectional shape, the transmission speed of an optical pulse signal propagating in this optical fiber changes in accordance with the polarization direction.

Hence, measuring any difference in transmission speed between optical signals propagating in different polarization directions in an optical fiber, i.e., measuring the transmission speed (polarization dispersion) in an optical fiber for each polarization direction is also a crucial performance testing item for the optical fiber.

This polarization dispersion can also be obtained by measuring a group delay amount for each pair of polarization components perpendicular to each other by this pulse method.

Unfortunately, the above measuring methods still have the following problems to be solved.

That is, in the wavelength dispersion measuring method shown in FIG. 14, an optical pulse passing through the optical fiber 12 is demultiplexed into two optical pulses, and a delay time is measured at each wavelength by using one optical pulse as reference light on the time base. Accordingly, the method is unaffected by a change in the optical path length of the optical fiber resulting from an external factor such as a temperature change.

The tunable wavelength band-pass filter 14, however, picks up a specific wavelength from the output light from the ultrashort pulse light source 11. Therefore, no present technology can prevent an increase in the pulse width (time width) of the optical pulse passing through the filter 14 resulting from limitations on the frequency band.

Accordingly, this method cannot easily locate the pulse peak position and is prone to many measurement errors.

For example, assuming that the passing wavelength width is 0.1 nm, the pulse width (time width) of the extracted optical pulse is probably 20 ps (picoseconds) or more.

As the delay time difference measuring means, the pulse waveform measuring device 18 constructed of, e.g., an electrical sampling oscilloscope is used.

Hence, the measuring method shown in FIG. 14 is effective to measure the dispersion of a long optical fiber (a few km or more) but difficult to use to measure low dispersion of a short optical fiber such as an EDF (the basic length of fiber amplifier EDF) about 20 m long.

In the wavelength dispersion measuring method shown in FIG. 13, the white pulse light source 1 for outputting a short pulse light group over a continuous broad wavelength range to accurately measure the wavelength dispersion is combined with the delay time difference measuring means 9 constructed of, e.g., a streak camera or the like. This enables more accurate measurement than in the wavelength dispersion measuring method shown in FIG. 14.

That is, since the spectral width of the white pulse light source 11 is as large as 200 nm, an optical band-pass filter 2 having a band width of about 1 nm can be inserted. Consequently, an optical pulse having a pulse width (time width) of a few ps can be obtained with no problem, so the peak position can be easily located.

When a streak camera is used as the delay time detecting means 9, however, the accuracy of in the time domain is 0.3 ps or more. This makes this method unsatisfactory to measure the wavelength dispersion of a low-dispersion object to be measured such as a short optical fiber.

This similarly applies to polarization dispersion measurement.

BRIEF SUMMARY OF THE INVENTION

The present invention has been made in consideration of the above situation and has as its object to provide a wavelength dispersion measuring apparatus which uses a method of sequentially sampling multiplexed light of a reference optical pulse and an outgoing optical pulse passing through an object to be measured by using an optical pulse whose pulse interval is delayed a predetermined time, and which thereby can artificially enlarge the wavelength of the multiplexed light, accurately measure any time difference between the reference optical pulse and the outgoing optical pulse, and measure the wavelength dispersion of a low-dispersion object to be measured, such as a short optical fiber, with high accuracy.

It is another object of the present invention to provide a polarization dispersion measuring apparatus capable of measuring the polarization dispersion of a low-dispersion object to be measured with high accuracy by using a method similar to the above method.

To achieve the above objects, according to one aspect of the present invention, there is provided a wavelength dispersion measuring apparatus comprising a first tunable wavelength pulse light source driven by a reference signal, an optical demultiplexer for demultiplexing a first optical pulse emitted from the first pulse light source into a reference optical pulse and an incident optical pulse to be sent into an object to be measured, an optical multiplexer for multiplexing the reference optical pulse and an outgoing optical pulse passing through the object to output multiplexed light, a second pulse light source for generating a second optical pulse which is synchronous with the first optical pulse and delays a predetermined time for each period of the first optical pulse, sampling means for receiving the multiplexed light and the second optical pulse to obtain an optical pulse train signal proportional to an intensity of the multiplexed light obtained in synchronism with the second optical pulse, and signal processing means for obtaining, from the optical pulse train signal from the sampling means, an envelope formed by peaks of individual optical pulses forming the optical pulse train, wherein wavelength dispersion of the object is obtained by measuring a delay time of the outgoing optical pulse passing through the object on the basis of intervals between the peaks of the envelope.

To achieve the above objects, according to another aspect of the present invention, there is provided a wavelength dispersion measuring apparatus comprising a first tunable wavelength pulse light source, an optical demultiplexer for demultiplexing a first optical pulse emitted from the first pulse light source into a reference optical pulse and an incident optical pulse to be sent into an object to be measured, an optical multiplexer for multiplexing the reference optical pulse and an outgoing optical pulse passing through the object to output multiplexed light, a second pulse light source for emitting a second optical pulse synchronous with a repeating frequency of the first optical pulse emitted from the first pulse light source, spatial optical delay means for changing a relative phase of the second optical pulse with respect to the first optical pulse, sampling means for receiving the multiplexed light and the output second optical pulse from the optical delay means to obtain, whenever the relative phase of the second optical pulse is changed, a correlation intensity signal proportional to an optical waveform of the multiplexed light in that phase, and signal processing means for obtaining the optical waveform of the multiplexed light from the correlation intensity signal obtained by the sampling means, wherein wavelength dispersion of the object is obtained by measuring a delay time of the outgoing optical pulse passing through the object on the basis of intervals between peaks of the optical waveform of the multiplexed light.

To achieve the above objects, according to still another aspect of the present invention, there is provided a polarization dispersion measuring apparatus comprising a first tunable wavelength pulse light source driven by a reference signal, an optical demultiplexer for demultiplexing a first optical pulse emitted from the first pulse light source into a reference optical pulse and an incident optical pulse to be sent into an object to be measured, an analyzer for passing a component in a specific polarization direction of an outgoing optical pulse passing through the object, an optical multiplexer for multiplexing the reference optical pulse and the outgoing optical pulse passing through the object and the analyzer to output multiplexed light, a second pulse light source for generating a second optical pulse which is synchronous with the first optical pulse and delays a predetermined time for each period of the first optical pulse, sampling means for receiving the multiplexed light and the second optical pulse to obtain an optical pulse train signal proportional to an intensity of the multiplexed light obtained in synchronism with the second optical pulse, and signal processing means for obtaining, from the optical pulse train signal from the sampling means, an envelope formed by peaks of individual optical pulses forming the optical pulse train, wherein polarization dispersion of the object is obtained by measuring a delay time of the outgoing optical pulse passing through the object on the basis of intervals between the peaks of the envelope.

To achieve the above objects, according to still another aspect of the present invention, there is provided a polarization dispersion measuring apparatus comprising a first tunable wavelength pulse light source, an optical demultiplexer for demultiplexing a first optical pulse emitted from the first pulse light source into a reference optical pulse and an incident optical pulse to be sent into an object to be measured, an analyzer for passing a component in a specific polarization direction of an outgoing optical pulse passing through the object, an optical multiplexer for multiplexing the reference optical pulse and the outgoing optical pulse passing through the object and the analyzer to output multiplexed light, a second pulse light source for emitting a second optical pulse synchronous with a repeating frequency of the first optical pulse emitted from the first pulse light source, spatial optical delay means for changing a relative phase of the second optical pulse with respect to the first optical pulse, sampling means for receiving the multiplexed light and the output second optical pulse from the optical delay means to obtain, whenever the relative phase of the second optical pulse is changed, a correlation intensity signal proportional to an optical waveform of the multiplexed light in that phase, and signal processing means for obtaining the optical waveform of the multiplexed light from the correlation intensity signal obtained by the sampling means, wherein polarization dispersion of the object is obtained by measuring a delay time of the outgoing optical pulse passing through the object on the basis of intervals between peaks of the optical waveform of the multiplexed light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A, 4B, and 4C are views for explaining the measurement principle of optical signal waveform measurement using sum frequency light;

FIGS. 5A and 5B are views for explaining the optical characteristic of a type II nonlinear optical material;

DETAILED DESCRIPTION OF THE INVENTION

Figure 1:
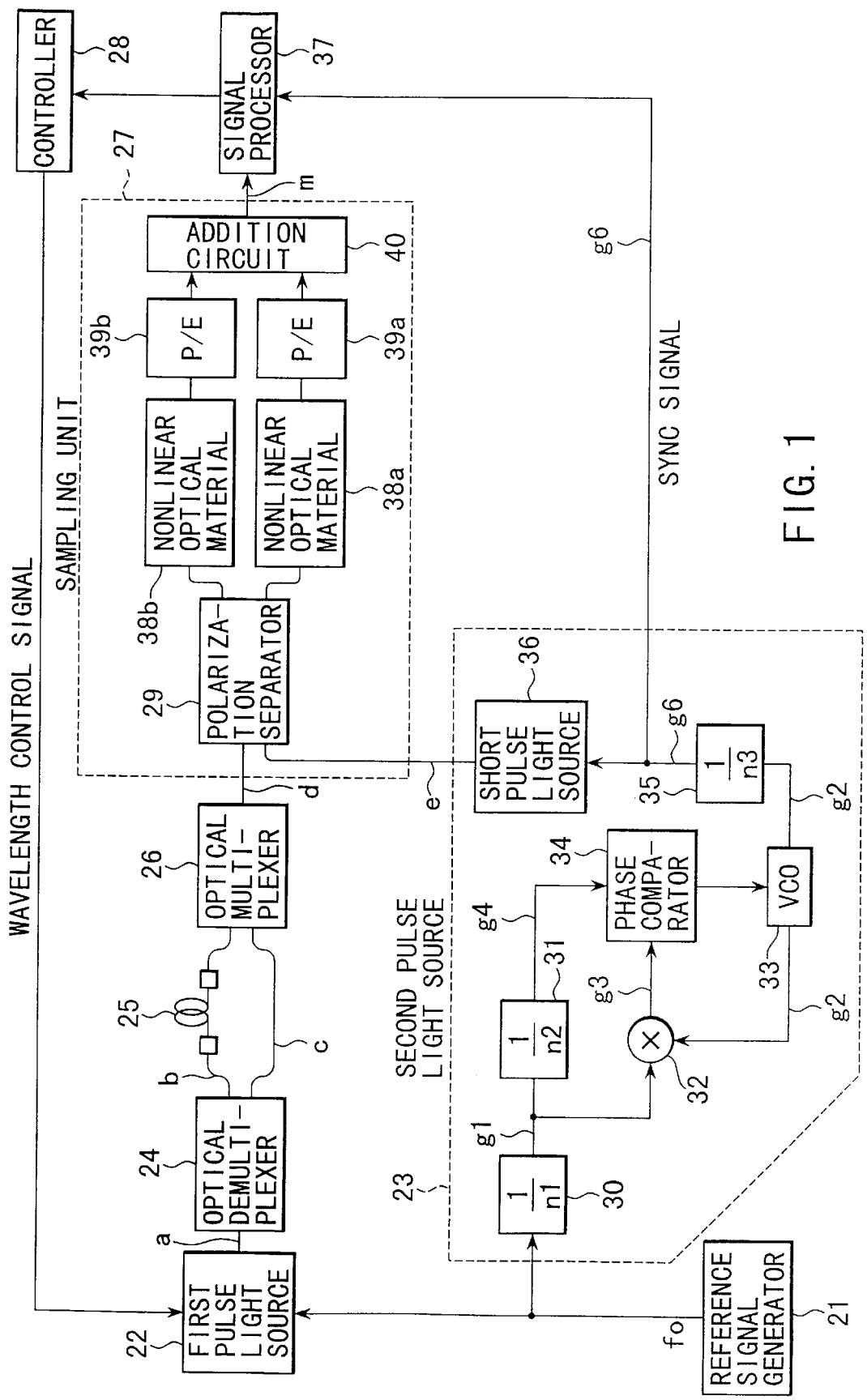
FIG. 1 is a block diagram showing a rough arrangement of a wavelength dispersion measuring apparatus according to the first embodiment of the present invention.

Reference will now be made in detail to the presently preferred embodiments of the invention and illustrated in the accompanying drawings, in which like reference characters designate like or corresponding parts throughout the several drawings.

An outline of the present invention will be described below.

To achieve the objects described above, a wavelength dispersion measuring apparatus according to the first invention comprises a first tunable wavelength pulse light source driven by a reference signal, an optical demultiplexer for demultiplexing a first optical pulse emitted from the first pulse light source into a reference optical pulse and an incident optical pulse to be sent into an object to be measured, an optical multiplexer for multiplexing the reference optical pulse and an outgoing optical pulse passing through the object to output multiplexed light, a second pulse light source for generating a second optical pulse which is synchronous with the first optical pulse and delays a predetermined time for each period of the first optical pulse, sampling means for receiving the multiplexed light and the second optical pulse to obtain an optical pulse train signal proportional to an intensity of the multiplexed light obtained in synchronism with the second optical pulse, and signal processing means for obtaining, from the optical pulse train signal from the sampling means, an envelope formed by peaks of individual optical pulses forming the optical pulse train, wherein wavelength dispersion of the object is obtained by measuring a delay time of the outgoing optical pulse passing through the object on the basis of intervals between the peaks of the envelope.

In this wavelength dispersion measuring apparatus constructed as above, the second optical pulse emitted from the second pulse light source is synchronous with the first optical pulse and delays the predetermined time for each period of the first optical pulse.

Accordingly, sequentially sampling the multiplexed light by using this second optical pulse is equivalent to sampling waveform positions slightly shifted for each period from the periodic multiplexed light waveform.

When, therefore, the envelope formed by the peaks of individual optical pulses in the optical pulse train from the sampling means is obtained, the waveform of this envelope corresponds to a waveform formed by artificially enlarging the multiplexed light waveform in the time base direction.

Consequently, from this enlarged multiplexed light waveform it is possible to accurately measure the time difference between the peak position of the outgoing optical pulse contained in the multiplexed light waveform and the peak position of the reference optical pulse, i.e., the delay time of the outgoing optical pulse passing through the object to be measured.

A wavelength dispersion measuring apparatus according to the second invention comprises a first tunable wavelength pulse light source, an optical demultiplexer for demultiplexing a first optical pulse emitted from the first pulse light source into a reference optical pulse and an incident optical pulse to be sent into an object to be measured, an optical multiplexer for multiplexing the reference optical pulse and an outgoing optical pulse passing through the object to output multiplexed light, a second pulse light source for emitting a second optical pulse synchronous with a repeating frequency of the first optical pulse emitted from the first pulse light source, spatial optical delay means for changing a relative phase of the second optical pulse with respect to the first optical pulse, sampling means for receiving the multiplexed light and the output second optical pulse from the optical delay means to obtain, whenever the relative phase of the second optical pulse is changed, a correlation intensity signal proportional to an optical waveform of the multiplexed light in that phase, and signal processing means for obtaining the optical waveform of the multiplexed light from the correlation intensity signal obtained by the sampling means, wherein wavelength dispersion of the object is obtained by measuring a delay time of the outgoing optical pulse passing through the object on the basis of intervals between peaks of the optical waveform of the multiplexed light.

In the wavelength dispersion measuring apparatus constructed as above, the sampling position can be changed by changing the relative phase of the second optical pulse emitted from the second pulse light source with respect to the first optical pulse by the spatial optical delay means.

When, therefore, the multiplexed light is sampled by this second optical pulse whenever the relative phase of the second optical pulse is changed with respect to the first optical pulse, it is possible to sample information of slightly shifted waveform positions of the periodic waveform of the multiplexed light.

Hence, the optical waveform of the multiplexed light can be obtained by signal-processing this sampled information while the relative phase change amount is plotted on the abscissa.

Consequently, from this multiplexed light waveform it is possible to accurately measure the delay time difference of the outgoing optical pulse passing through the object to be measured from the optical delay amount difference between the peak positions of the outgoing optical pulse and the reference optical pulse both contained in the multiplexed light waveform, i.e., the relative phase difference.

In a waveform dispersion measuring apparatus according to the third invention, the sampling means of each of the waveform dispersion measuring apparatuses described above comprises a polarization separator for separating each of the multiplexed light and the second optical pulse into two light components having polarization planes that are 90° out of phase, multiplexing two pairs of the separated multiplexed light and second optical pulse having polarization planes that are 90° out of phase, and outputting the two pairs of multiplexed light components to different optical paths, a pair of nonlinear optical materials each capable of phase matching of the second kind by which a cross-correlation signal of the multiplexed light and second output pulse, which are output to a corresponding one of the optical paths and have polarization planes that are 90° out of phase, is generated as sum frequency light, a pair of photodetectors for converting the output sum frequency light components from the nonlinear optical materials into electrical signals, and an addition circuit for adding the output electrical signals from the photodetectors to output a sum electrical signal as an optical pulse train signal.

In the sampling means constructed as above, the polarization separator separates each of the multiplexed light and the second optical pulse into two light components having polarization planes that are 90° out of phase, thereby generating a total of four light components.

Additionally, from these four light components the polarization separator outputs two pairs of multiplexed light and second optical pulse having polarization planes that are perpendicular to each other to different optical paths.

These pairs of sampling light and light to be measured output from the different optical paths and having polarization planes that are 90° out of phase are sent into different nonlinear optical materials and output as different sum frequency light components.

These sum frequency light components are converted into electrical signals by different photodetectors and added, and the sum electrical signal is output as an optical pulse train signal.

In this arrangement, therefore, when the polarized state of the multiplexed light changes, the optical intensity of the output multiplexed light from one optical path of the polarization separator lowers, but the optical intensity of the output multiplexed light from the other optical path increases. This cancels the increase and decrease in the sum frequency light resulting from variations in the polarized state of the multiplexed light. Consequently, the sum electrical signal contains almost no variation components. Accordingly, it is possible to accurately measure the waveform of the multiplexed light obtained by the waveform of the envelope by the signal processing means.

In a wavelength dispersion measuring apparatus according to the fourth invention, the sampling means of each of the wavelength dispersion measuring apparatuses described above comprises a multiplexer for multiplexing the multiplexed light and the second optical pulse by shifting polarization planes thereof 90° from each other, a nonlinear optical material capable of phase matching of the second kind by which a cross-correlation signal of the multiplexed light and the second optical pulse, which are output from the multiplexer and have polarization planes that are 90° out of phase, is generated as sum frequency light, and a photodetector for converting the output sum frequency light from the nonlinear optical material into an electrical signal.

The sampling means constructed as above uses one nonlinear optical material.

Even in an arrangement like this, however, satisfactory measurement accuracy can be obtained when the polarization planes of the multiplexed light and the second optical pulse are accurately 90° out of phase.

In a wavelength dispersion measuring apparatus according to the fifth invention, the sampling means of each of the wavelength dispersion measuring apparatuses described above comprises a pair of polarization controllers disposed on optical axes of the multiplexed light and the second optical pulse to make polarization planes of the multiplexed light and the second optical pulse parallel to each other, a lens inserted on optical axes of the multiplexed light and the second optical pulse passing through the polarization controllers to focus the multiplexed light and the second optical pulse to a single point, a nonlinear optical material disposed on a focal point of the lens and capable of phase matching of the first kind by which a cross-correlation signal of the multiplexed light and the second optical pulse is generated as sum frequency light, a slit for separating the sum frequency signal generated by the nonlinear optical material, the multiplexed light, and the second optical pulse, and a photodetector for converting the sum frequency signal separated by the slit into an electrical signal.

The wavelength dispersion measuring apparatuses according to the third and fourth inventions described above use a nonlinear optical material capable of phase matching of the second kind and having a high S/N ratio as the nonlinear optical material for generating the sum frequency light.

In the wavelength dispersion measuring apparatus according to this fifth invention, however, light components except for the sum frequency light are removed by using the lens and the slit. Therefore, the sum frequency light can be extracted with satisfactorily high accuracy even when a nonlinear optical material capable of phase matching of the first kind is used.

In a wavelength dispersion measuring apparatus according to the sixth invention, the second pulse light source of the wavelength dispersion measuring apparatus according to the first invention described above comprises a first frequency divider for reducing a frequency of the reference signal to $1/n_1$, a second frequency divider for reducing a frequency of the frequency-divided signal from the first frequency divider to $1/n_2$, a mixer for synthesizing the frequency-divided signal from the first frequency divider and the output signal from the VCO to output a synthetic signal, a phase comparator for comparing a phase of the frequency-divided signal from the second frequency divider with a phase of the synthetic signal from the mixer to supply a voltage signal corresponding to a frequency difference to the VCO (a voltage-controlled oscillator), a third frequency divider for reducing a frequency of the output signal from the VCO to $1/n_3$, and a short pulse light source driven by the frequency-divided signal from the third frequency divider.

With this arrangement, it is readily possible to obtain the second optical pulse which is synchronous with the first optical pulse and delays the predetermined time for each period of the first optical pulse.

A polarization dispersion measuring apparatus according to the seventh invention comprises a first tunable wavelength pulse light source driven by a reference signal, an optical demultiplexer for demultiplexing a first optical pulse emitted from the first pulse light source into a reference optical pulse and an incident optical pulse to be sent into an object to be measured, an analyzer for passing a component in a specific polarization direction of an outgoing optical pulse passing through the object, an optical multiplexer for multiplexing the reference optical pulse and the outgoing optical pulse passing through the object and the analyzer to output multiplexed light, a second pulse light source for generating a second optical pulse which is synchronous with the first optical pulse and delays a predetermined time for each period of the first optical pulse, sampling means for receiving the multiplexed light and the second optical pulse to obtain an optical pulse train signal proportional to an intensity of the multiplexed light obtained in synchronism with the second optical pulse, and signal processing means for obtaining, from the optical pulse train signal from the sampling means, an envelope formed by peaks of individual optical pulses forming the optical pulse train, wherein polarization dispersion of the object is obtained by measuring a delay time of the outgoing optical pulse passing through the object on the basis of intervals between the peaks of the envelope.

In the polarization dispersion measuring apparatus constructed as above, the analyzer for passing a component in a specific polarization direction of the outgoing optical pulse passing through the object to be measured is inserted in the optical path of the outgoing optical pulse.

The multiplexed light of this outgoing optical pulse and the reference optical pulse contains a peak of the reference optical pulse and a peak indicating the component in the specific polarization direction of the outgoing optical pulse.

Accordingly, by using a method similar to that of the aforementioned wavelength dispersion measuring apparatus, a delay time in this specific polarization direction can be obtained from the waveform of the multiplexed light by measuring the delay time of the peak indicating the component in the specific polarization direction of the outgoing optical pulse from the peak of the reference optical pulse.

The polarization dispersion of the object to be measured is obtained by sequentially changing the polarization direction of the analyzer.

A polarization dispersion measuring apparatus according to the eighth invention comprises a first tunable wavelength pulse light source, an optical demultiplexer for demultiplexing a first optical pulse emitted from the first pulse light source into a reference optical pulse and an incident optical pulse to be sent into an object to be measured, an analyzer for passing a component in a specific polarization direction of an outgoing optical pulse passing through the object, an optical multiplexer for multiplexing the reference optical pulse and the outgoing optical pulse passing through the object and the analyzer to output multiplexed light, a second pulse light source for emitting a second optical pulse synchronous with a repeating frequency of the first optical pulse emitted from the first pulse light source, spatial optical delay means for changing a relative phase of the second optical pulse with respect to the first optical pulse, sampling means for receiving the multiplexed light and the output second optical pulse from the optical delay means to obtain, whenever the relative phase of the second optical pulse is changed, a correlation intensity signal proportional to an optical waveform of the multiplexed light in that phase, and signal processing means for obtaining the optical waveform of the multiplexed light from the correlation intensity signal obtained by the sampling means, wherein polarization dispersion of the object is obtained by measuring a delay time of the outgoing optical pulse passing through the object on the basis of intervals between peaks of the optical waveform of the multiplexed light.

In the polarization dispersion measuring apparatus constructed as above, as in the polarization dispersion measuring apparatus according to the seventh invention, the polarization dispersion of the object to be measured is obtained by sequentially changing the polarization direction of the analyzer.

Embodiments of the present invention based on the aforementioned outline will be described below with reference to the accompanying drawings.

(First Embodiment)

FIG. 1 is a block diagram showing a rough arrangement of a wavelength dispersion measuring apparatus according to the first embodiment of the present invention.

A reference signal generator 21 outputs a reference signal of a frequency $f_0$ (=9.95328 GHz) to first and second pulse light sources 22 and 23.

The first pulse light source 22 is a tunable wavelength light source constructed of, e.g., a mode-locked ring type EDF laser which outputs transform-limited optical pulses. This first pulse light source 22 outputs a first optical pulse a whose frequency (period T) is the reference frequency $f_0$.

If a TL pulse (Transform-Limited pulse) is used as an optical pulse, more accurate measurements can be performed.

A wavelength $\lambda$ of this first optical pulse a is variably controlled by a wavelength control signal from a controller 28 which monitors and controls the whole measurement process.

An optical demultiplexer 24 demultiplexes the output first optical pulse a from the first pulse light source 22 into an incident optical pulse b to be sent into an object 25 to be measured, e.g., an optical fiber, and a reference optical pulse c.

An optical multiplexer 26 multiplexes the incident optical pulse b passing through the object 25 and the reference pulse c and outputs multiplexed light d to one input of a polarization separator 29 of a subsequent sampling unit 27.

The other input of this polarization separator 29 receives an output second optical pulse e from the second pulse light source 23. This second optical pulse e is synchronous with the first optical pulse a and delays a predetermined time $\Delta T$ for each period T of the first optical pulse a.

Figure 2:
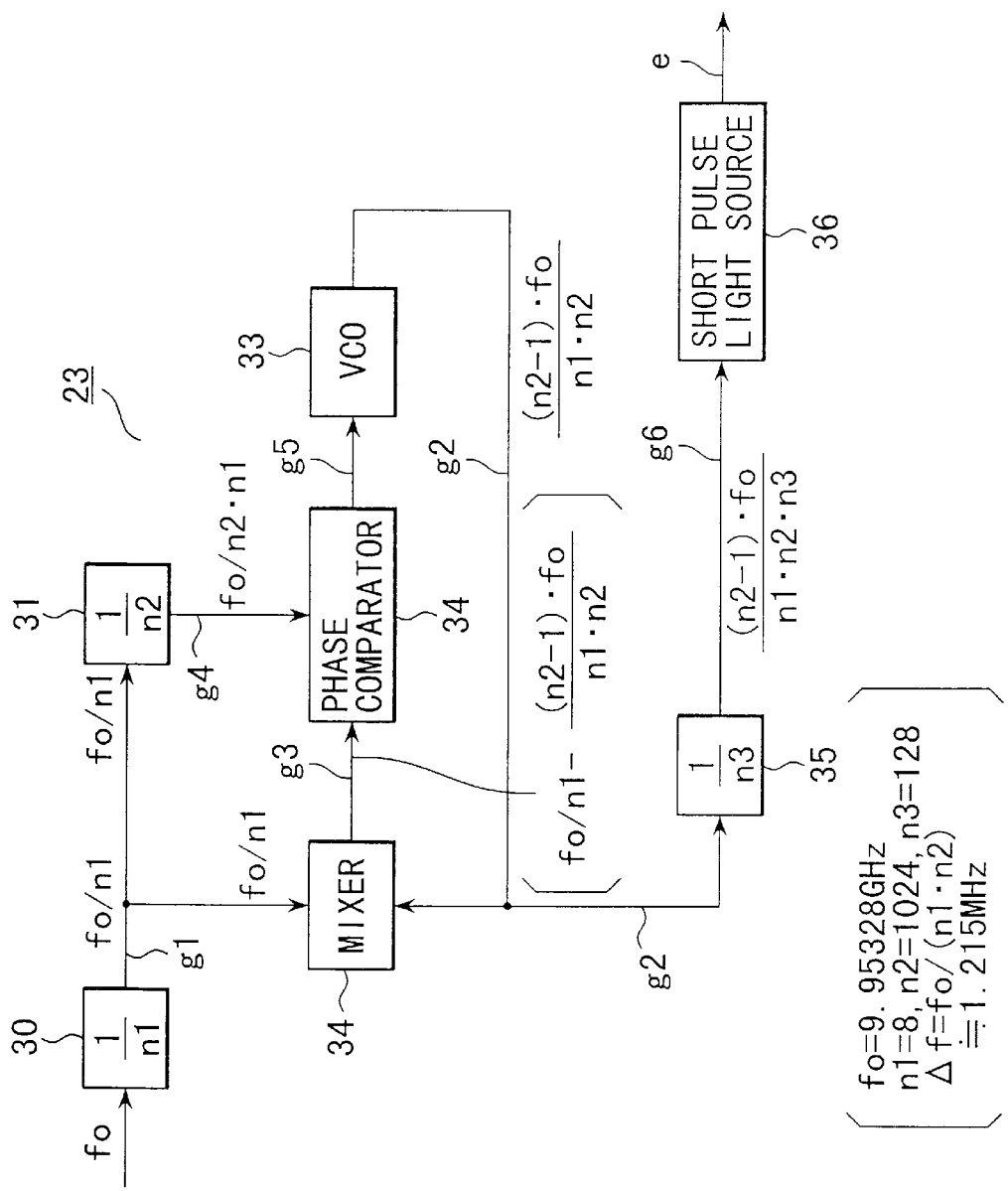
FIG. 2 is a block diagram for explaining the operation of a second pulse light source in the wavelength dispersion measuring apparatus according to the first embodiment of the present invention.

In this second pulse light source 23, as shown in FIG. 2, a first frequency divider 30 reduces the frequency of the input reference signal with the reference frequency $f_0$ from the reference signal generator 21 to $1/n_1$ (=1/8).

A second frequency divider 31 further reduces the frequency of a frequency-divided signal $g_1$ from the first frequency divider 30 to $1/n_2$ (=1/1,024) and applies the signal to a mixer (signal synthesizing circuit) 32.

This mixer 32 synthesizes the frequency-divided signal $g_1$ from the first frequency divider 30 and an output signal $g_2$ from a VCO (Voltage-Controlled Oscillator) 33 and supplies a synthetic signal $g_3$ to a phase comparator 34.

An output frequency-divided signal $g_4$ from the second frequency divider 31 is also applied to the phase comparator 34.

The phase comparator 34 compares the phase of the frequency-divided signal $g_4$ from the second frequency divider 31 with the phase of the synthetic signal $g_3$ from the mixer 32 and supplies an error signal $g_5$ corresponding to the phase difference to the VCO 33.

Additionally, a third frequency divider 35 reduces the frequency of the output signal $g_2$ from the VCO 33 to $1/n_3$ (=1/128).

A frequency-divided signal $g_6$ from this third frequency divider 35 is input to a short pulse light source 36.

The frequency-divided signal $g_6$ from the third frequency divider 35 is also input as a sync signal to a signal processor 37.

Similar to the first pulse light source 21, the short pulse light source 36 is constructed of, e.g., mode-locked ring type EDF laser and outputs the second optical pulse e synchronous with the frequency-divided signal $g_6$ from the third frequency divider 35.

Note that the wavelength $\lambda$ of the output second optical pulse e from the short pulse light source 36 is fixed.

As described above, the second light source 23 with the above arrangement outputs a second optical pulse e which is synchronous with the first optical pulse a and delays the predetermined time $\Delta$ for each period T of the first optical pulse a. The principle of this operation will be described next.

In the second pulse light source 23 shown in FIG. 2, if a frequency $F_{VCO}$ of the output signal $g_2$ from the VCO 33 is given by $$f_{VCO} = (n_2-1) \cdot f_0/(n_1 \cdot n_2)$$

then, the frequencies of the frequency-divided signal $g_4$ and the synthetic signal $g_3$ from the second frequency divider 31 and the mixer 32, respectively, to the phase comparator 34 are $f_0/(n_1 \cdot n_2)$.

This means that the phase comparator 34 feeds the error signal $g_5$ between the frequency-divided signal $g_4$ and the synthetic signal $g_3$ back to the VCO 33, i.e., performs so-called PLL control.

Once again, the meaning of the frequency $f_{VCO}$ of the output signal $g_2$ from the VCO 33 will be described below.

This method uses the generation of beats of pulse sources having slightly shifted repeating frequencies.

If, however, two simply frequency-divided signals are prepared, the timing of synchronization is constantly the same. So, one of these two signals cannot be delayed the predetermined time $\Delta T$ for each period.

Hence, the frequency $f_{VCO}$ of the output signal $g_2$ from the VCO 33 is oscillated with a shift of $\{f_0/(n_1 \cdot n_2)\}$ from $\{n_2 \cdot f_0/(n_1 \cdot n_2)\}$, thereby letting $\Delta T$ be the time corresponding to the difference between the phase of the reference frequency $f_0$ and the phase $f_{VCO}$ of the output signal $g_2$ from the VCO 33 for each period.

The above operating principle will be explained below by taking practical values as examples.

Assuming that the frequency $f_0$ of the reference signal is 9.95328 GHz and the frequency dividing ratios are $n_1=8$, $n_2=1,024$, and $n_3=128$, the frequency of the frequency-divided signal $g_1$ from the first frequency divider 30 is $f_0/n_1$ (=9.95328 GHz/8=1.24416 GHz), and the frequency of the frequency-divided signal $g_4$ from the second frequency divider 31 is $f_0/(n_1 \cdot n_2)=1.125$ MHz.

On the other hand, the frequency $f_{VCO}$ of the output signal $g_2$ from the VCO 33 is set at $[(n_2-1) \cdot (f_0/(n_1 \cdot n_2))]$ as described above. Accordingly, the frequency of the synthetic signal $g_3$ passing through the mixer 32 is $f_0/(n_1 \cdot n_2)$.

The phase comparator 34 compares the synthetic signal $g_3$ with the frequency-divided signal $g_4$ and inputs the error signal $g_5$ to the VCO 33.

By PLL control, therefore, the reference signal and the output signal $g_2$ from the VCO 33 become in phase with each other, although their frequencies are different.

The actually calculated value of the frequency $f_{VCO}$ of the output signal $g_2$ from the VCO 33 is 1.242945 GHz.

Accordingly, a frequency $f_{A/D}$ of the frequency-divided signal $g_6$ from the third frequency divider 35 is $$f_{A/D} = (n_2-1) \cdot f_0 / (n_1 \cdot n_2 \cdot n_3)$$

Since $n_3 = 128$ in the above equation, $f_{A/D}$ 9.7105 MHz.

A period $T_{A/D}$ is $1/f_{A/d}$, so the actually calculated value of $T_{A/D}$ is approximately 100 ns (nanoseconds).

It follows from the foregoing that the output pulse interval of the output second optical pulse e from the second pulse light source 23 has a period of about 100 ns.

Next, the relative phase difference between the reference signal and the frequency-divided signal $g_6$ from the third frequency divider 35 for each period of about 100 ns will be described below.

As described above, the frequency $f_{A/D}$ of the frequency-divided signal $g_6$ is $$T_{A/D} = 1/f_{A/D}$$

$$= n_1 \cdot n_2 \cdot n_3 / \{(n_2-1) \cdot f_0\}$$

Since $n_2 = n_1 \cdot n_3$, $$T_{A/D} = n_2[n_2/\{(n_2-1) \cdot f_0\}]$$

Additionally, the period $T_{A/D}$ of this frequency-divided signal $g_6$ can be rewritten as $$T_{A/D} = (n_2+1)/f_0 + 1\{(n_2-1) \cdot f_0\}$$

A frequency $f_{OPT}$ of a driving signal (the frequency-divided signal $g_6$ from the third frequency divider 35) for the short pulse light source 36 is $$f_{OPT} = (n_2-1) \cdot f_0 / (n_1 \cdot n_2 \cdot n_3)$$

Accordingly, the time difference $\Delta T$ between the light source driving signal (frequency-divided signal $g_6$) and the reference signal $1/(n_1 \cdot n_2 \cdot n_3)$ is given by $$1/\Delta T = [(n_2-1) \cdot f_0 / (n_1 \cdot n_2 \cdot n_3)]$$

$$-[f_0 1/(n_1 \cdot n_2 \cdot n_3)]$$

Hence, $$\Delta T = 1/\{(n_2-1) \cdot f_0\}$$

Consequently, the time difference $\Delta T$ is 0.098 ps (picosecond), i.e., approximately 0.1 ps.

As described above, when the second pulse light source 23 is used, a phase difference of about 0.1 ps is produced between the two frequencies for each period of 100 ns. Therefore, if sampling is performed whenever 100 ns elapse, information of a position shifted about 0.1 ps can be obtained.

More specifically, frequency dividers generally put on the market can only calculate the second powers.

Accordingly, it is possible to form a frequency divider which generates a 1/1,024-frequency signal from an input clock (reference frequency). However, no frequency divider for generating a 1/1,023-frequency signal cannot be formed.

In the second pulse light source 23 of this embodiment, therefore, PLL control is performed by shifting, from the reference signal, the output signal $g_2$ from the VCO 33 by 1/1,024 the frequency of the reference signal, thereby obtaining a 1/1,023-frequency signal synchronizing with the reference signal.

Details of the sampling unit 27 will be described below with reference to FIG. 3.

The polarization separator 29, a nonlinear optical material 38*a*, and a photodetector 39*a* are disposed on the optical axis of the incident multiplexed light d from the optical multiplexer 36. The polarization separator 29, a nonlinear optical material 38*b*, and a photodetector 39*b* are inserted on the optical axis of the incident second optical pulse e from the second pulse light source 23.

The sampling unit 27 further incorporates an addition circuit 40 for adding output electrical signals $k_1$ and $k_2$ from the photodetectors 39*a* and 39*b*, respectively.

The waveform of the multiplexed light d can be measured by using the sampling unit 27 with the above arrangement. The principle of this measurement will be described below with reference to FIGS. 4A to 5B.

For example, as shown in FIGS. 4A and 4B, the multiplexed light d is an optical signal to be measured which has a repeating frequency f (period T). The second optical pulse e is sampling light which has a pulse width far narrower than the pulse width T of the multiplexed light d and has a repeating frequency $(f-\Delta f)$ slightly lower (or higher) than the repeating frequency f (period T) of the multiplexed light d. When these multiplexed light d and second optical pulse e simultaneously enter the nonlinear optical material 38*a* (38*b*) of phase matching of the second kind (to be referred to as type II hereinafter because it is also called type II), sum frequency light h (optical pulse train) proportional to the product of the intensities of these two light components d and e is output only when the two light components d and e superpose on each other at the same time.

The repeating frequency of this sum frequency light h (optical pulse train) is the repeating frequency $(f-\Delta f)$ of the second optical pulse e. Therefore, the response speed of the photodetector 39*a* (39*b*) need only be higher than this repeating frequency $(f-\Delta f)$. Additionally, the time resolution is determined by the pulse width of the second optical pulse e. Hence, as shown in FIG. 4C, an envelope j formed by the individual peaks of the sum frequency light h (optical pulse train) has a waveform formed by artificially enlarging the multiplexed light d in the time base direction. This allows accurate measurement of the waveform of the multiplexed light d.

As shown in FIG. 5A, when the multiplexed light d with an angular frequency $\omega_D$ and the second optical pulse e with an angular frequency $\omega_S$ are sent into one end face of the type II nonlinear optical material 38*a* (38*b*) in a direction in which the polarization planes of these two light components are perpendicular to each other, a sum frequency light h with a sum angular frequency ($\omega_S$ and $\omega_D$) is output from the other end face.

FIG. 5B is a graph showing the relationship between the angular frequency $\omega$ of each of the multiplexed light d, the second optical pulse e, and the sum frequency light h and optical power P.

Figure 3:
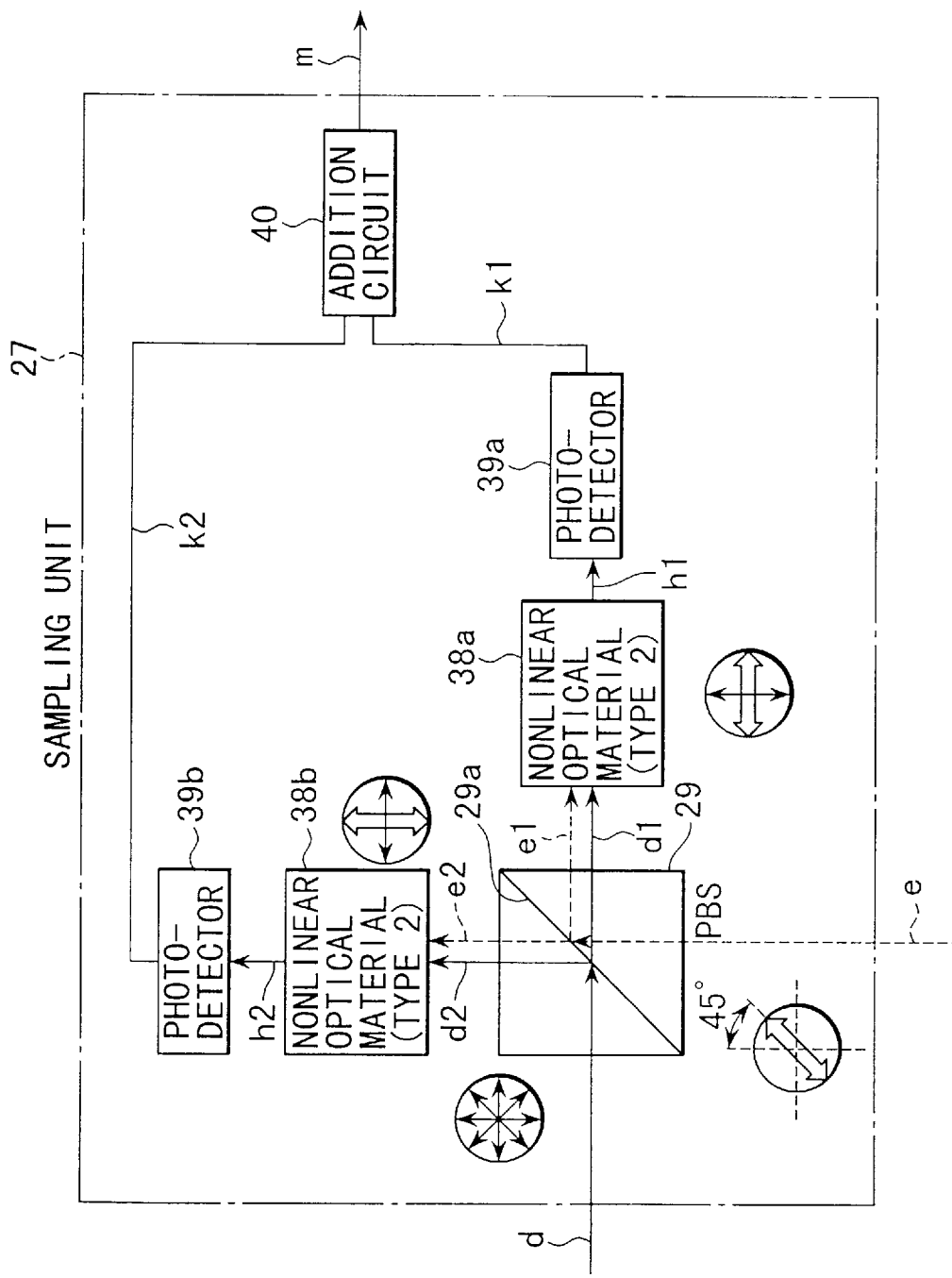
FIG. 3 is a block diagram showing details of the structure of a sampling unit in the wavelength dispersion measuring apparatus according to the first embodiment of the present invention.

Referring to FIG. 3, the input multiplexed light d having the repeating frequency $f_0$ enters the polarization separator 29.

The second optical pulse e having an angular frequency different from that of the multiplexed light d and the pulse-waveform repeating frequency $(f_0-\Delta f)$ has a single polarization plane making 45° with the reference direction (0° direction).

This second optical pulse e enters the polarization separator 29.

The polarization separator 29 constructed of, e.g., a polarization beam splitter (PBS) incorporates a half mirror 29*a* on the surface of which a polarization coating is formed.

Of incident light components, this half mirror 29a passes a polarization component making 90° with the reference direction (0° direction) and reflects a polarization component in the reference direction (0° direction).

Accordingly, a polarization component $e_1$ in the reference direction of the second optical pulse e having a substantially 45° polarization plane and a polarization component $d_1$ in the 90° direction of the multiplexed light d enter the type II nonlinear optical material 38a.

Meanwhile, a polarization component $e_2$ in the 90° direction of the second optical pulse e and a polarization component $d_2$ in the reference direction of the multiplexed light d enter the type II nonlinear optical material 38b.

Since the second optical pulse $e_1$ and the multiplexed light $d_1$ having polarization planes that are 90° out of phase enter the nonlinear optical material 39a, the phase matching condition is satisfied. Therefore, this type II nonlinear optical material 38a outputs sum frequency light $h_1$ having a sum angular frequency to the subsequent photodetector 39a.

Analogously, the second optical pulse $e_2$ and the multiplexed light $d_2$ having polarization planes that are 90° out of phase enter the nonlinear optical material 38b, so the phase matching condition is satisfied. Hence, this type II nonlinear optical material 38b outputs sum frequency light $h_2$ having a sum angular frequency to the subsequent photodetector 39b.

The photodetectors 39a and 39b convert the incident sub frequency light components $h_1$ and $h_2$ into electrical signals $k_1$ and $k_2$, respectively, and transmit these signals to the addition circuit 40.

The addition circuit adds the electrical signals $k_1$ and $k_2$ and supplies an optical pulse train signal m to the subsequent signal processor 37.

In this optical sampling unit 27 as described above, the polarization plane of the output second optical pulse e from the second pulse light source 23 makes around 45° with the reference direction. Additionally, the half mirror 29a of the polarization separator 29 makes around 45° with the optical axes of the second optical pulse e and the multiplexed light d. This makes the transmitted light intensity and reflected light intensity of the polarization separator 29 substantially equal to each other.

That is, of the second optical pulse e separated by the polarization separator 29, the optical intensity of the polarization component $e_1$ in the reference direction is nearly equal to the optical intensity of the polarization component $e_2$ perpendicular to the reference direction.

Meanwhile, the polarized state of the multiplexed light d containing the incident optical pulse b passing through the object 25 to be measured is disturbed by the state of the object 25. Hence, the multiplexed light components $d_1$ and $d_2$ output from the polarization separator 29 and having polarization planes in the reference direction and a direction perpendicular to the reference direction, respectively, have unequal optical intensities.

From the foregoing, the optical intensities of the outgoing sub frequency light components $h_1$ and $h_2$ from the nonlinear optical materials 38a and 38b are unequal.

On the other hand, the sum electrical signal of the electrical signals $k_1$ and $k_2$ formed by photoelectrically converting the sum frequency light components $h_1$ and $h_2$ by the photodetectors 39a and 39b, respectively, is originally a signal obtained by demultiplexing one multiplexed light d. Therefore, the electrical signals $k_1$ and $k_2$ compensate each other to cancel the change in waveform of the multiplexed light d caused by variations in the polarized state of the multiplexed light d.

That is, the sum electrical signal of the electrical signals $k_1$ and $k_2$ is stabilized, so the signal processor 37 and the controller 28 can accurately measure the waveform of the envelope j of the multiplexed Light d regardless of the polarized state.

As explained earlier with reference to FIGS. 4A to 4C, from the input optical pulse train signal m from the sampling unit 27, the signal processor 37 obtains an envelope j indicating a signal waveform formed by enlarging the multiplexed light d in the time base direction and supplies this envelope j to the controller 28 which is a computer.

From the waveform of this envelope j, the controller 28 calculates the delay time $t_D$ Of the outgoing optical pulse b contained in this enlarged multiplexed light d from the reference optical pulse c.

The measurement of the delay time $t_D$ for one wavelength λ is complete by the above operation. Hence, the controller 28 supplies a wavelength control signal to change the wavelength λ of the output first optical pulse a from the first pulse light source 22.

The controller 28 then measures the delay time $t_D$ for the changed wavelength λ.

Finally, the controller 28 obtains the dependence of the delay time $t_D$ on the wavelength λ, i.e., the wavelength dispersion characteristic of the object 25 to be measured, such as an optical fiber.

In the wavelength dispersion measuring apparatus of the first embodiment constructed as above, as shown in FIG. 4A, the output second optical pulse e from the second pulse light source 23 is synchronous with the output first optical pulse a from the first pulse light source 22 and delays the predetermined time ΔT for each period T of the first optical pulse a.

On the basis of this second optical pulse e, the sampling unit 27 sequentially samples the multiplexed light d of the outgoing optical pulse b passing through the object 25, such as an optical fiber, and the reference optical pulse c, thereby obtaining an envelope j formed by the peaks of individual optical pulses in an output optical pulse train from the sampling unit 27.

As shown in FIG. 4C, this envelope j has a waveform formed by artificially enlarging the waveform of the multiplexed light d in the time base direction.

Accordingly, it is possible from this enlarged waveform of the multiplexed light d to accurately measure the time difference between the peak positions of the outgoing optical pulse d and the reference optical pulse c both contained in the waveform of this multiplexed light d, i.e., the delay time $t_D$ of the outgoing optical pulse d passing through the object to be measured.

Figure 6A:
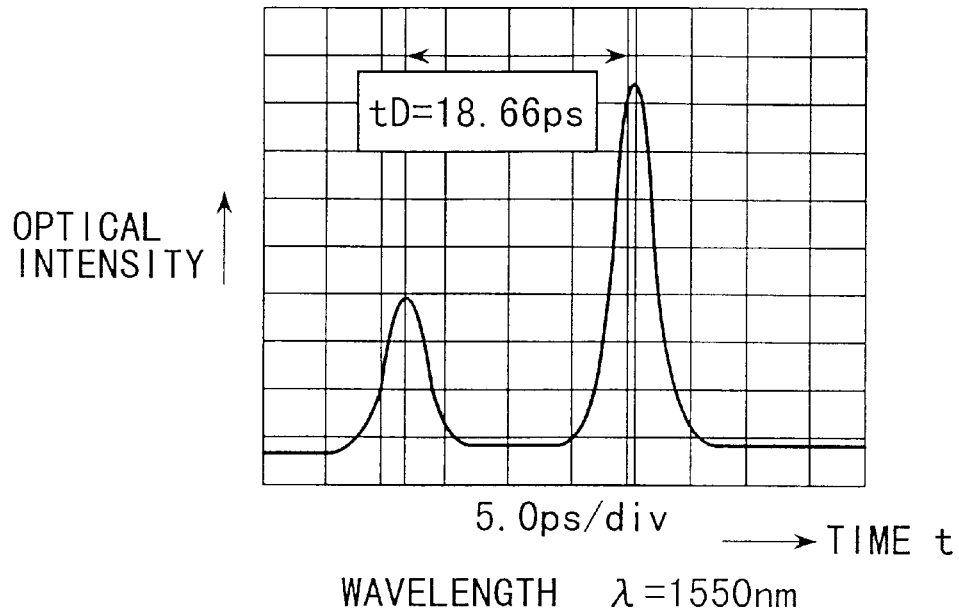
FIGS. 6A and 6B are graphs showing delay times of wavelengths measured by using the wavelength dispersion measuring apparatus according to the first embodiment of the present invention.
Figure 6B:
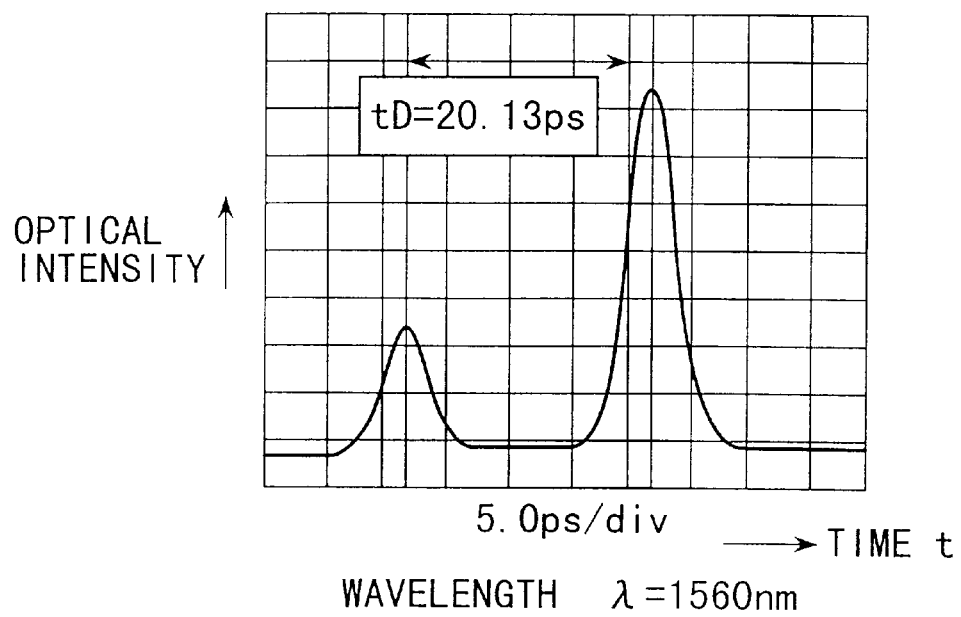

FIGS. 6A and 6B show the measurement results of the delay time $t_D$ of the outgoing optical pulse b from the reference optical pulse c at wavelength λ=1,550 nm and wavelength λ=1,560 nm, respectively.

Figure 7:
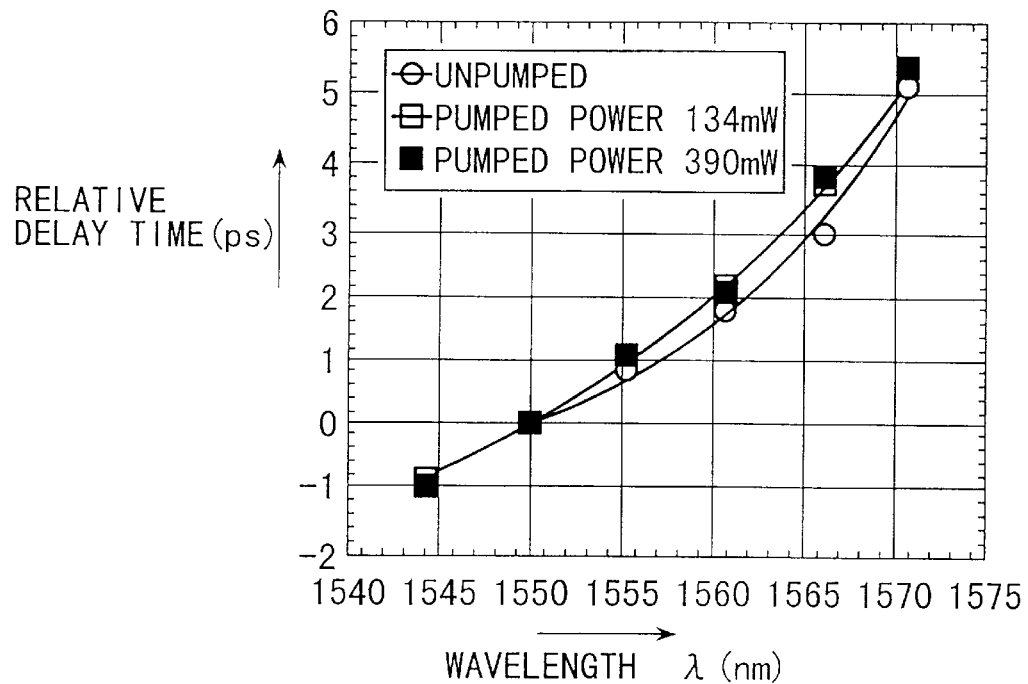
FIG. 7 is a graph showing wavelength dispersion characteristics measured by using the wavelength dispersion measuring apparatus according to the first embodiment of the present invention.

Also, FIG. 7 shows the measured wavelength dispersion characteristics by plotting the wavelength on the abscissa and the relative delay time on the ordinate.

As indicated by these measured values, the wavelength dispersion measuring apparatus of this embodiment has a minimum delay time detection limit of 0.1 ps.

With the arrangement of the present invention, however, the measurement limit of the delay time $t_D$ is readily changeable by changing the frequency dividing ratios $n_1$, $n_2$, and $n_3$ of the frequency dividers 30, 31, and 35 incorporated into the second pulse light source 23. For example, a detection limit of 0.01 ps is possible.

Note that no system capable of measuring a delay time difference $t_D$ of 0.01 ps currently exists.

(Second Embodiment)

Figure 8:
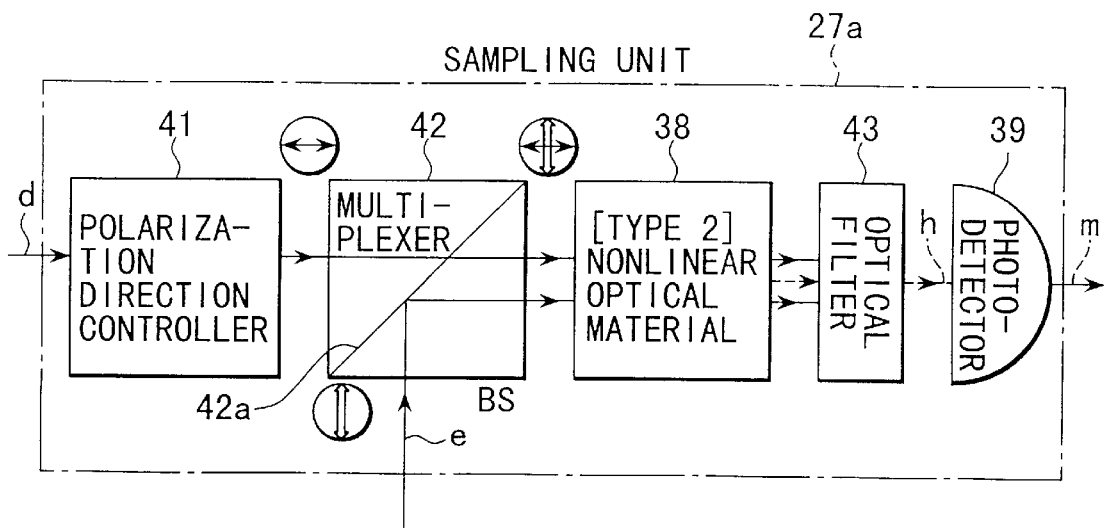
FIG. 8 is a block diagram showing details of the structure of a sampling unit in a wavelength dispersion measuring apparatus according to the second embodiment of the present invention.

FIG. 8 is a block diagram showing a rough arrangement of a sampling unit 27a incorporated into a wavelength dispersion measuring apparatus according to the second embodiment of the present invention.

The rest of the arrangement except this sampling unit 27a is the same as the wavelength dispersion measuring apparatus of the first embodiment shown in FIG. 1, so a detailed description of identical parts will be omitted.

Referring to FIG. 8, a polarization direction controller 41 controls output multiplexed light d from an optical multiplexer 26 to have a polarization direction perpendicular to a reference direction. After that, this multiplexed light d enters a multiplexer 42 constructed of a beam splitter having the same configuration as the polarization separator 29 of the first embodiment.

The multiplexed light d is transmitted through a half mirror 42a of this multiplexer 42 and sent into a type II nonlinear optical material 38.

Meanwhile, a second optical pulse e emitted from a second pulse light source 23 and having a polarization direction equal to the reference direction directly enters the multiplexer 42.

That is, the second optical pulse e is reflected by the half mirror 42a of the multiplexer 42 and sent into the type II nonlinear optical material 38.

Since, therefore, the second optical pulse e and the multiplexed light d having polarization planes that are 90° out of phase enter the type II nonlinear optical material 38, the phase matching condition is satisfied. Consequently, the type II nonlinear optical material 38 outputs sum frequency light h having a sum angular frequency to a subsequent photodetector 39 through an optical filter 43.

The optical filter 43 removes unwanted wavelength components from the sum frequency light h.

The photodetector 39 converts the sum frequency light h into an electrical signal and transmits the signal as an optical pulse train signal m to a subsequent signal processor 37.

The sampling unit 27a with the above arrangement can receive the multiplexed light d and the second optical pulse e and obtain an optical pulse train signal m proportional to the intensity of the multiplexed light d obtained in synchronism with the second optical pulse e. Consequently, substantially the same operation and effect of the sampling unit 27 shown in FIG. 3 can be obtained.

Accordingly, the wavelength dispersion measuring apparatus of the second embodiment incorporating this sampling unit 27a can achieve substantially the same effect as the wavelength dispersion measuring apparatus of the first embodiment.

(Third Embodiment)

Figure 9:
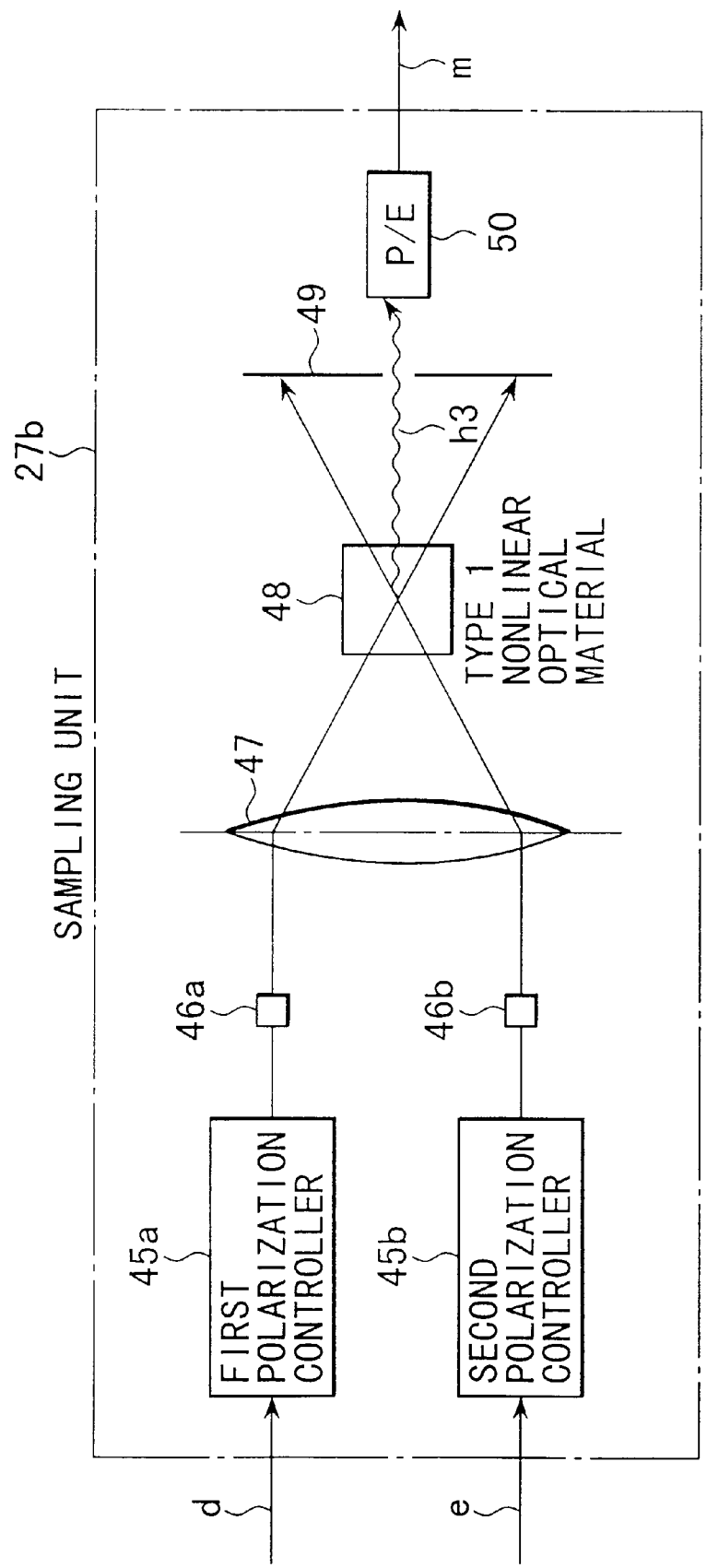
FIG. 9 is a block diagram showing details of the structure of a sampling unit in a wavelength dispersion measuring apparatus according to the third embodiment of the present invention.

FIG. 9 is a block diagram showing a rough arrangement of a sampling unit 27b incorporated into a wavelength dispersion measuring apparatus according to the third embodiment of the present invention.

The rest of the arrangement except this sampling unit 27b is the same as the wavelength dispersion measuring apparatus of the first embodiment shown in FIG. 1, so a detailed description of identical parts will be omitted.

Referring to FIG. 9, output multiplexed light d from an optical multiplexer 26 enters a lens 47 via a first polarization direction controller 45a and an optical collimator 46a.

Meanwhile, an output second optical pulse e from a second pulse light source 23 enters the lens 47 via a second polarization direction controller 45b and an optical collimator 46b.

The polarization directions of output light components from the first and second polarization direction controllers 45a and 45b are set to the same direction.

Accordingly, the polarization planes of the multiplexed light d and the second optical pulse e are parallel to each other.

The lens 47 focuses the incident multiplexed light d and second optical pulse e to the same focusing position.

A type I (phase matching of the first kind) nonlinear optical material 48 is disposed in this focusing position of the lens 47.

Hence, sum frequency light $h_3$ having the sum angular frequency of the multiplexed light d and the second optical pulse e is output from the other end face of the type I nonlinear optical material 48.

A slit 49 is placed on the optical axis of this sum frequency light $h_3$ in a direction perpendicular to this optical axis.

As shown in FIG. 9, this slit 49 passes only the sum frequency light $h_3$ and intercepts the multiplexed light d and the second optical pulse e refracted by the lens 47.

The sum frequency light $h_3$ passing through the slit 49 enters a subsequent photodetector 50.

The photodetector 50 converts the sum frequency signal $h_3$ into an electrical signal and supplies the signal as an optical pulse train signal m to a subsequent signal processor 37.

The sampling unit 27b with the above arrangement can receive the multiplexed light d and the second optical pulse e and obtain an optical pulse train signal m proportional to the intensity of the multiplexed light d obtained in synchronism with the second optical pulse e. Consequently, substantially the same operation and effect of the sampling unit 27 shown in FIG. 3 can be obtained.

Accordingly, the wavelength dispersion measuring apparatus of the third embodiment incorporating this sampling unit 27b can achieve substantially the same effect as the wavelength dispersion measuring apparatus of the first embodiment.

(Fourth Embodiment)

Figure 10:
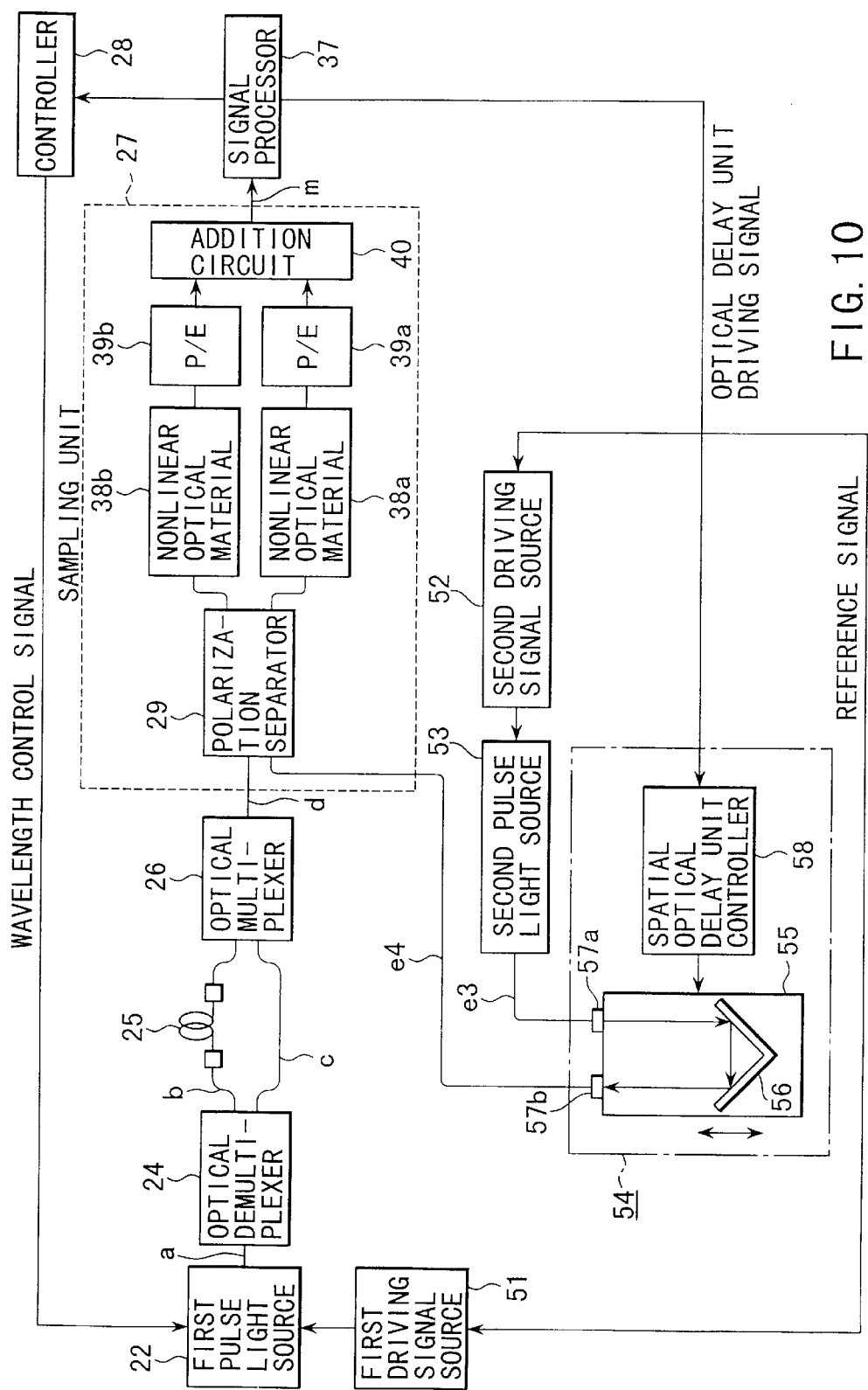
FIG. 10 is a block diagram showing a rough arrangement of a wavelength dispersion measuring apparatus according to the fourth embodiment of the present invention.

FIG. 10 is ea block diagram showing a rough arrangement of a wavelength dispersion measuring apparatus according to the fourth embodiment of the present invention.

In FIG. 10, the same reference numerals as in the wavelength dispersion measuring apparatus of the first embodiment shown in FIG. 1 denote the same parts, and a detailed description thereof will be omitted.

A first pulse light source 22 emits a first optical pulse a having a repeating frequency synchronous with an output driving signal (reference signal) from a first driving signal source 51.

As in the wavelength dispersion measuring apparatus of the first embodiment shown in FIG. 1, an optical demultiplexer 24 demultiplexes the first optical pulse a emitted from the first pulse light source 22 into an incident optical pulse b to be sent into an object 25 to be measured, such as an optical fiber, and a reference optical pulse c.

An optical multiplexer 26 multiplexes the incident optical pulse b passing through the object 25 and the reference optical pulse c and outputs multiplexed light d to one input of a polarization separator 29 of a subsequent sampling unit 27.

The other input of this polarization separator 29 receives, via an optical delay means 54, a second optical pulse $e_4$ having a repeating frequency which is an integral fraction of the repeating frequency of the first optical pulse a.

Details of the arrangement and operation of this optical delay means 54 will be described below.

The first driving signal source 51 supplies a driving signal to the first pulse light source 22 and also supplies a reference signal synchronous with the driving signal to a second driving signal source 52.

In synchronism with this reference signal, the second driving signal source 52 supplies a driving signal to a second pulse light source 53.

The relationship between the frequencies of the driving signals from the first and second driving signal sources 51 and 52 is maintained at, e.g., 1:n (n is an integer).

The second pulse light source 53 emits a second optical pulse $e_3$ in synchronism with the reference signal, i.e., this second optical pulse $e_3$ synchronous with the first optical pulse a emitted from the first pulse light source 22.

In the apparatus of the fourth embodiment as described above, the first driving signal source 51 transmits the reference signal to the second driving signal source 52.

This reference signal is necessary to accurately synchronize the driving signals from the first and second driving signal sources 51 and 52. Therefore, if a signal source having high frequency accuracy, e.g., a hydrogen maser, is used as a source oscillator, it is unnecessary to transmit any reference signal from the first driving signal source 51 to the second driving signal source 52.

The second optical pulse $e_3$ emitted from the second pulse light source 53 enters a corner cube mirror 56 movably disposed on an optical stage 55 of a spatial optical delay unit via a collimator 57a in the optical delay means 54.

The corner cube mirror 56 reverses the optical path of the incident second optical pulse $e_3$ through 180° and applies the pulse as a new second optical pulse $e_4$ to the other input of the polarization separator 29 of the sampling unit 27 via a collimator 57b.

A spatial optical delay unit controller 58 controls the position of the corner cube mirror 56 on the optical stage 55. This controller 58 is a stepping motor with a rotary encoder controllable by an input optical delay unit driving signal from a signal processor 37.

If the position of the corner cube mirror 56 on the optical stage 55 changes, the optical path length of the second optical pulse $e_4$ changes accordingly. Therefore, the spatial optical delay unit controller 58 changes this optical path length to appropriately set the relative phase of the second optical pulse $e_4$, output from the optical delay means 54 to the other input of the polarization separator 29, with respect to the first optical pulse a.

The signal processor 37 obtains an optical pulse train signal m proportional to the intensity of the multiplexed light d obtained in synchronism with the second optical pulse $e_4$ and also increases the relative phase by the optical delay unit driving signal.

This increase in the relative phase is equivalent to sequential delay of the output timing of the second optical pulse $e_4$ from that of the first optical pulse a, as in the case of the second optical pulse e in the wavelength dispersion measuring apparatus of the first embodiment shown in FIG. 1.

Upon receiving this second optical pulse $e_4$ and the multiplexed light d described above, the sampling unit 27 operates in the same manner as the sampling unit 27 of the wavelength dispersion measuring apparatus of the first embodiment shown in FIG. 1, and supplies the optical pulse train signal m to the signal processor 37.

From the input optical pulse train signal m from the sampling unit 27, the signal processor 37 obtains an envelope j indicating a signal waveform formed by enlarging multiplexed light d in the time base direction and supplies this envelope j to a controller 28 which is a computer.

From the waveform of this envelope j, the controller 28 calculates a delay time $t_D$ of the outgoing optical pulse b contained in this enlarged multiplexed light d from the reference optical pulse c.

The measurement of the delay time $t_D$ for one wavelength λ is complete by the above operation. Hence, the controller 28 transmits a wavelength control signal to change the wavelength λ of the output first optical pulse a from the first pulse light source 22.

The controller 28 then measures the delay time $t_D$ for the changed wavelength λ.

Finally, the controller 28 obtains the dependence of the delay time $t_D$ on the wavelength λ, i.e., the wavelength dispersion characteristic of an object 25 to be measured, such as an optical fiber.

Accordingly, the wavelength dispersion measuring apparatus of this fourth embodiment can achieve substantially the same effect as the wavelength dispersion measuring apparatus of the first embodiment shown in FIG. 1.

Additionally, in the wavelength dispersion measuring apparatus of this fourth embodiment, the spatial optical delay unit constructing the optical delay means 54 can easily change the optical delay amount on the order of 1 μm (approximately 0.003 ps in time) by using the optical delay unit control signal from the signal processor 37. Also, the maximum moving amount is equal to or larger than a space length corresponding to the repeating period of the first pulse light source 22.

By, therefore, moving the second optical pulse $e_4$ relative to the multiplexed light d in accordance with the optical delay unit driving signal from the signal processor 37 and sequentially measuring the optical intensity in different positions of the waveform of the multiplexed light d, it is possible to obtain a correlation intensity signal (optical pulse) proportional to the waveform of the multiplexed light d, i.e., the peaks of the incident optical pulse b entering the object 25 and of the reference optical pulse c with an accuracy of 0.003 ps.

Accordingly, the group delay amount of the outgoing optical pulse b passing through the object 25 can be measured with an accuracy of 0.003 ps on the basis of the intervals between the peaks of the correlation intensity signal (optical pulse) thus obtained. This allows the wavelength dispersion measuring apparatus of this fourth embodiment to measure the wavelength dispersion of the object 25 with much higher accuracy than those of conventional apparatuses.

The relationship between the optical delay means 54 and the measurement accuracy in the wavelength dispersion measuring apparatus of the fourth embodiment will be described below.

As described previously, in the wavelength dispersion measuring apparatus of the fourth embodiment the repeating frequencies of the first and second optical pulses a and $e_4$ have a frequency dividing ratio of 1:n (n is an integer).

As a consequence, only information of the same waveform position can be obtained when sampling is performed without moving the corner cube mirror 56 of the spatial optical delay unit.

Hence, the optical waveform of the multiplexed light d is obtained by changing the timings at which the multiplexed light d and the second optical pulse $e_4$ reach the sampling unit 27. From this optical waveform, the peaks of the incident optical pulse b entering the object 25 to be measured and the reference optical pulse c are obtained by plotting the spatial delay amount on the abscissa.

That is, the optical path length in the spatial optical delay unit is changed to timewise change the initial phase of the second optical pulse $e_4$, and measurement is performed by converting the abscissa's parameter from time to space. In this manner accuracy which can be obtained by directly measuring time is obtained from space length with high accuracy.

Also, in the wavelength dispersion measuring apparatus of this fourth embodiment, the ratio of the frequency of the driving signal from the first driving signal source 51 to the first pulse light source 22 to the frequency of the driving signal from the second driving signal source 52 to the second pulse light source 53 is 1:n (n is an integer), i.e., an integral fraction.

This setting is used to allow the signal processor 37 to easily load in data.

That is, since the driving frequency ratio of the first driving signal source 51 to the second driving signal source 52 is an integral fraction, the same position of the multiplexed light d can be constantly sampled unless the optical delay means 54 changes the relative phase of the second optical pulse $e_3$.

This means that the optical waveform of the multiplexed light d can be obtained without processing data obtained each time the relative phase of the second optical pulse $e_3$ is changed.

In this measuring apparatus, however, two actual frequencies need only be synchronous with each other. Thus, the driving frequency ratio of the first driving signal source to the second driving signal source 52 can also be set to the ratio of an arbitrary integer to an arbitrary integer, e.g., 5:2, 2:3, or 3:4.

If this is the case, the second optical pulse $e_4$ does not sample the multiplexed light d in the same position any longer even if the relative phase is changed. Therefore, the signal processor 37 needs to be so set as to obtain the optical waveform from information only when the second optical pulse $e_4$ samples the same waveform position of the multiplexed light d.

It is easy to obtain information only when the repeating frequencies of the second optical pulse $e_4$ and the first optical pulse a sample the same waveform position.

For example, if the driving frequency ratio of the first driving signal source 51 to the second driving signal source 52 is 5:2, the least common multiple is 10. Therefore, the signal processor 37 need only obtain the optical waveform from sampling data for every ten second optical pulses $e_4$.

(Fifth Embodiment)

Figure 11:
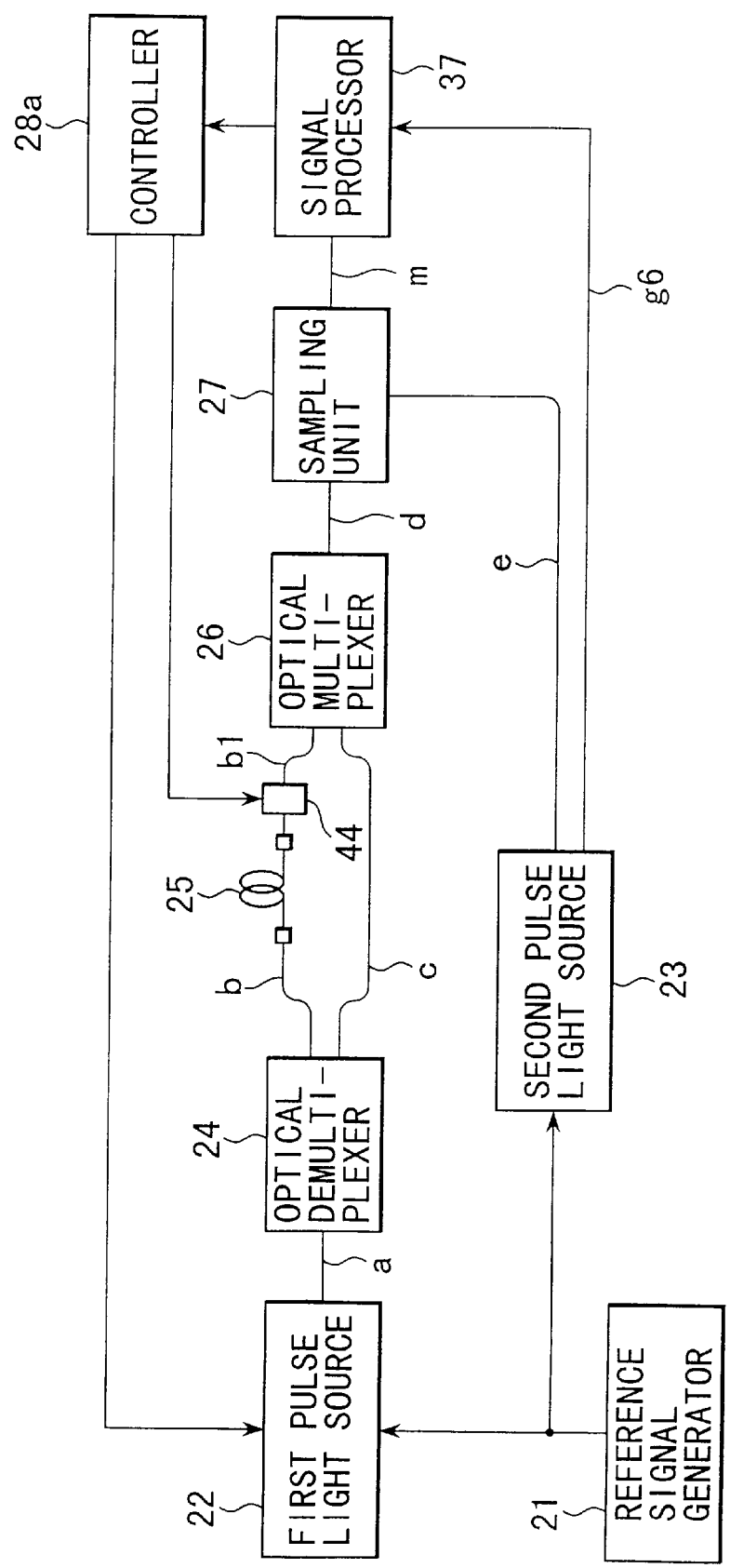
FIG. 11 is a block diagram showing a rough arrangement of a polarization dispersion measuring apparatus according to the fifth embodiment of the present invention.

FIG. 11 is a block diagram showing a rough arrangement of a polarization dispersion measuring apparatus according to the fifth embodiment of the present invention.

In FIG. 11, the same reference numerals as in the wavelength dispersion measuring apparatus of the first embodiment shown in FIG. 1 denote the same parts, and a detailed description thereof will be omitted.

A reference signal generator 21 supplies a reference signal to first and second pulse light sources 22 and 23.

The first pulse light source 22 outputs a first optical pulse a synchronous with the reference signal.

A wavelength λ of this first optical pulse a is variably controlled by a wavelength control signal from a controller 28a.

Input light to an analyzer 44 is sometimes converted into linearly polarized light depending upon the polarized state of an incident optical pulse b and upon the polarization characteristics of an object 25 to be measured.

In a case like this, a polarization controller is inserted in a position before the incident optical pulse b enters the object 25.

An optical demultiplexer 24 demultiplexes the output first optical pulse a from the first pulse light source 22 into the incident optical pulse b to be sent into the object 25 to be measured, such as an optical fiber, and a reference optical pulse c.

The incident optical pulse b passing through the object 25 enters the analyzer 44.

Of the incident optical pulse b passing through the object 25, this analyzer 44 passes only a light component in a polarization direction α set by the controller 28a.

An optical multiplexer 26 multiplexes an incident optical pulse $b_1$ passing through the object 25 and the reference optical pulse c and outputs multiplexed light d to one input of a polarization separator (not shown) in a subsequent sampling unit 27.

The other input of the polarization separator in this sampling unit 27 receives an output second optical pulse e from the second pulse light source 23. This second optical pulse e is synchronous with the first optical pulse a and delays a predetermined time ΔT for each period T of the first optical pulse a.

The waveform of the multiplexed light d obtained by the optical multiplexer 26 contains the peaks of the incident optical pulse $b_1$ composed of only the specific light component in the polarization direction α which passes through the analyzer 44, and the peaks of the reference optical pulse c.

As in the case of the multiplexed light d in the wavelength dispersion measuring apparatus of the first embodiment, therefore, by using this second optical pulse e the sampling unit 27 and a signal processor 37 can obtain the waveform of an envelope j corresponding to a waveform obtained by enlarging the waveform of the multiplexed light d in the time base direction.

The waveform of this envelope j is supplied to the controller 28a.

From the waveform of the envelope j obtained by enlarging the waveform of the multiplexed light d in the time base direction, the controller 28a calculates a delay time $t_D$ of the peak of the incident optical pulse $b_1$ from the peak of the reference optical pulse c.

The delay time $t_D$ of the incident optical pulse b in one polarization direction α is obtained by the above operation. Therefore, the controller 28a changes the polarization direction α of the analyzer 44 and calculates the delay time $t_D$ in this polarization direction α.

In this manner the controller 28a calculates the delay time $t_D$ while changing the polarization direction α from 0 to 2π. The dependence of the delay time $t_D$ on the polarization direction α is the polarization dispersion characteristic of the object 25 to be measured such as an optical fiber.

In the polarization dispersion measuring apparatus of the fifth embodiment constructed as above, the sampling unit 27 obtains the waveform of the envelope j corresponding to the waveform formed by enlarging the waveform of the multiplexed light d in the time base direction. Hence, as in the wavelength dispersion measuring apparatuses of the first and second embodiments, the delay time $t_D$ of the incident optical pulse $b_1$ from the reference optical pulse c can be measured with high accuracy.

Accordingly, the polarization dispersion measuring apparatus of this fifth embodiment can greatly improve the measurement accuracy of the polarization dispersion characteristics.

(Sixth Embodiment)

Figure 12:
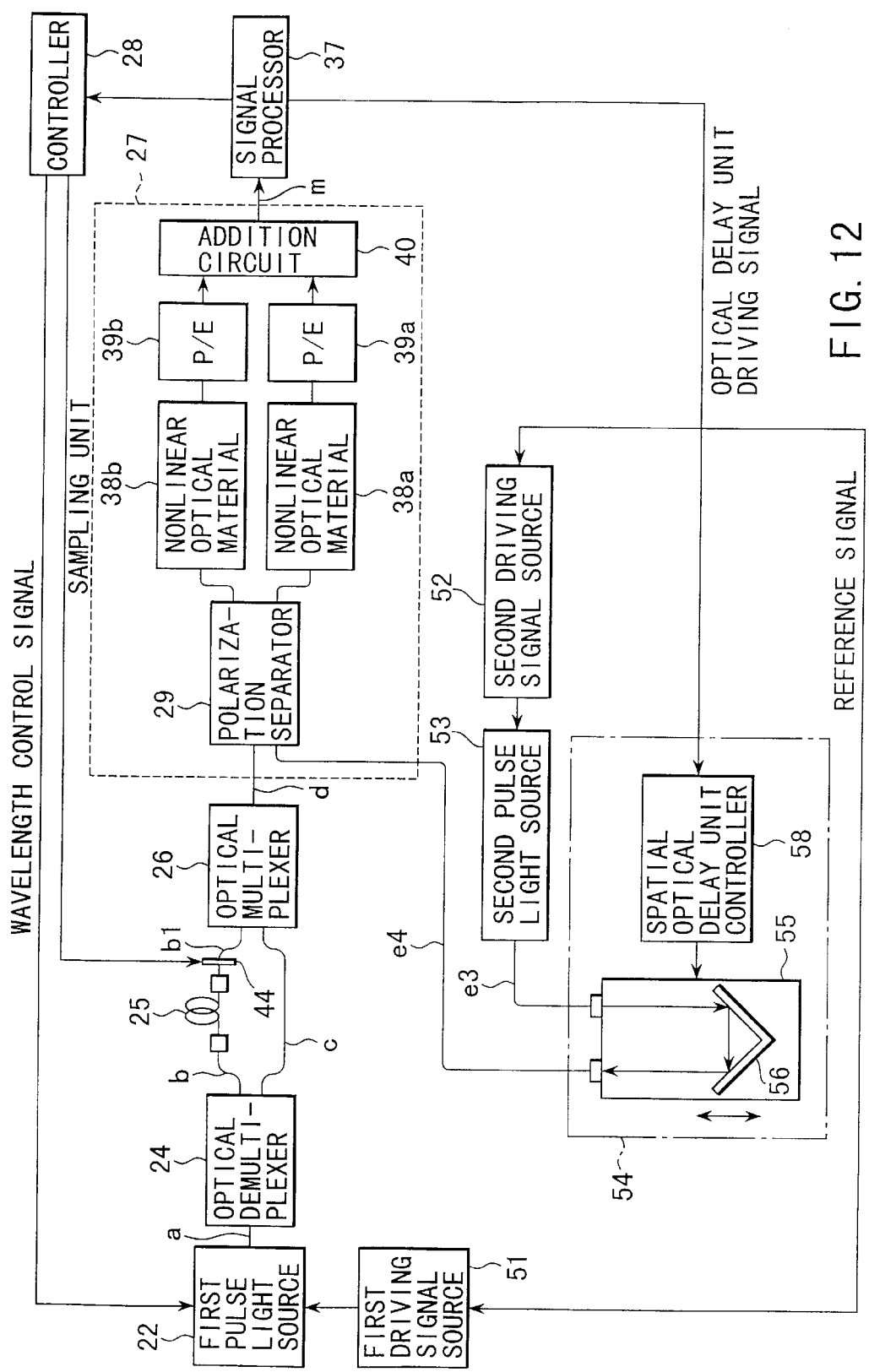
FIG. 12 is a block diagram showing a rough arrangement of a polarization dispersion measuring apparatus according to the sixth embodiment of the present invention.
Figure 13:
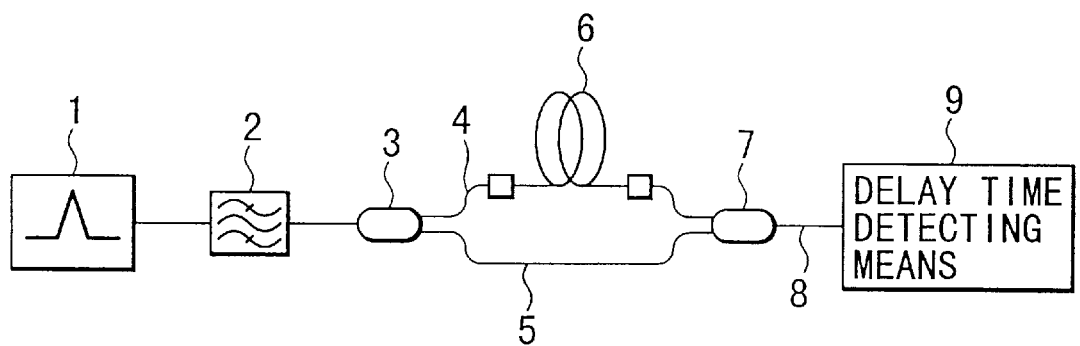
FIG. 13 is a block diagram showing a rough arrangement of a wavelength dispersion measuring apparatus using a conventional pulse method.
Figure 14:
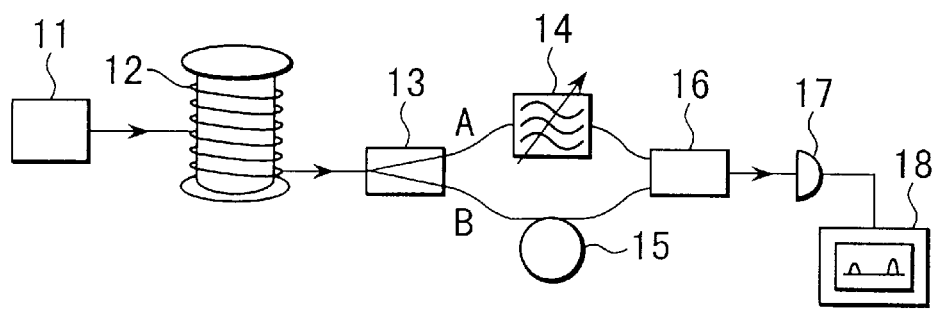
FIG. 14 is a block diagram showing a rough arrangement of a wavelength dispersion measuring apparatus using a conventional pulse method.

FIG. 12 is a block diagram showing a rough arrangement of a polarization dispersion measuring apparatus according to the sixth embodiment of the present invention.

In FIG. 12, the same reference numerals as in the wavelength dispersion measuring apparatus of the fourth embodiment shown in FIG. 10 denote the same parts, and a detailed description thereof will be omitted.

In the polarization dispersion measuring apparatus of this sixth embodiment, as in the polarization dispersion measuring apparatus of the fifth embodiment shown in FIG. 11, an analyzer 44 whose polarization direction α is controlled by a controller 28a is inserted between an object 25 to be measured and an optical multiplexer 26.

A first pulse light source 22 emits a first optical pulse a.

A wavelength λ of the first optical pulse a is variably controlled by a wavelength control signal from the controller 28a.

An optical demultiplexer 24 demultiplexes the first optical pulse a emitted from the first pulse light source 22 into an incident optical pulse b to be sent into the object 25 to be measured, such as an optical fiber, and a reference optical pulse c.

The incident optical pulse b passing through the object 25 enters the analyzer 44.

The optical multiplexer 26 multiplexes an incident optical pulse $b_1$ passing through the analyzer 44 and the reference optical pulse c and supplies multiplexed light d to one input of a subsequence sampling unit 27.

The other input of this sampling unit 27 receives, via an optical delay means 54, a second optical pulse $e_4$ having a repeating frequency which is an integral fraction of the repeating frequency of the first optical pulse a.

In the polarization dispersion measuring apparatus of this sixth embodiment, therefore, as in the wavelength dispersion measuring apparatus of the fourth embodiment shown in FIG. 10, the sampling unit 27 supplies an optical pulse train signal m to a signal processor 37.

From the input optical pulse train signal m from the sampling unit 27, the signal processor 37 obtains an envelope j indicating a signal waveform formed by enlarging the multiplexed light d in the time base direction and supplies the envelope j to the controller 28a which is a computer.

From the waveform of the envelope j formed by enlarging the waveform of the multiplexed light d in the time base direction, the controller 28a calculates a delay time $t_D$ of the peak of the incident optical pulse $b_1$ from the peak of the reference optical pulse c.

The delay time $t_D$ of the incident optical pulse b in one polarization direction α is obtained by the above operation. Therefore, the controller 28a changes the polarization direction α of the analyzer 44 and calculates the delay time $t_D$ in this polarization direction α.

In this manner the controller 28a calculates the delay time $t_D$ while changing the polarization direction α from 0 to 2π. The dependence of the delay time $t_D$ on the polarization direction α is the polarization dispersion characteristic of the object 25 to be measured such as an optical fiber.

In the polarization dispersion measuring apparatus of the sixth embodiment constructed as above, the sampling unit 27 obtains the waveform of the envelope j corresponding to the waveform formed by enlarging the waveform of the multiplexed light d in the time base direction. Hence, as in the polarization dispersion measuring apparatus of the fifth embodiment, the delay time $t_D$ of the incident optical pulse $b_1$ from the reference optical pulse c can be measured with high accuracy.

Accordingly, the polarization dispersion measuring apparatus of this sixth embodiment can greatly improve the measurement accuracy of the polarization dispersion characteristics.

The present invention is not limited to the apparatuses according to the first to sixth embodiments described above.

For example, the sampling unit 27b shown in FIG. 9 can be used in place of the sampling unit 27 in the wavelength dispersion measuring apparatus of the first embodiment shown in FIG. 1.

Also, the sampling unit 27a shown in FIG. 8 or the sampling unit 27b shown in FIG. 9 can be used in place of the sampling unit 27 in the wavelength dispersion measuring apparatus of the fourth embodiment shown in FIG. 10.

Furthermore, the sampling unit 27a shown in FIG. 8 or the sampling unit 27b shown in FIG. 9 can be used instead of the sampling unit 27 in each of the wavelength dispersion measuring apparatuses of the fifth and sixth embodiments shown in FIGS. 11 and 12.

As has been described above, the wavelength dispersion measuring apparatus and the polarization dispersion measuring apparatus of the present invention sequentially sample multiplexed light of a reference optical pulse and an outgoing optical pulse passing through an object to be measured by using a second optical pulse whose pulse interval is delayed a predetermined time, and thereby obtain the waveform of an envelope formed by artificially enlarging the waveform of this multiplexed light in the time base direction.

Accordingly, the wavelength dispersion measuring apparatus and the polarization dispersion measuring apparatus of the present invention can accurately measure any time difference between the outgoing optical pulse passing through the object to be measured and the reference optical pulse. This enables accurate measurements of the wavelength dispersion and polarization dispersion of a low-dispersion object to be measured, such as a short optical fiber.

Also, in the wavelength dispersion measuring apparatus and the polarization dispersion measuring apparatus of the present invention, the repeating frequencies of first and second optical pulses are synchronous with each other to change the timings at which multiplexed light and the second optical pulse reach a sampling unit. In this way a correlation intensity signal proportional to the optical waveform of the multiplexed light, i.e., the peaks of an incident optical pulse entering an object to be measured and the peaks of a reference optical pulse are obtained by plotting the spatial delay amount on the abscissa.

Hence, the wavelength dispersion measuring apparatus and the polarization dispersion measuring apparatus of the present invention can accurately measure the wavelength dispersion of a low-dispersion object to be measured, such as a short optical fiber, which is difficult to measure by conventional measuring devices.

In other words, the wavelength dispersion measuring apparatus and the polarization dispersion measuring apparatus of the present invention comprise a spatial optical delay means for changing the relative phase of the second optical pulse with respect to the first optical pulse. Therefore, the abscissa's parameter can be converted from time to space, so measurement accuracy which cannot be obtained by direct measurement of time is obtained from the moving amount of the spatial optical delay means with high accuracy. Consequently, it is possible to accurately measure the wavelength dispersion and polarization dispersion of a low-dispersion object to be measured, such as a short optical fiber, which is difficult to measure by conventional measuring devices.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A wavelength dispersion measuring apparatus comprising:

a first tunable wavelength pulse light source driven by a reference signal;

an optical demultiplexer for demultiplexing a first optical pulse emitted from said first pulse light source into a reference optical pulse and an incident optical pulse to be sent into an object to be measured;

an optical multiplexer for multiplexing the reference optical pulse and an outgoing optical pulse passing through the object to output multiplexed light;

a second pulse light source for generating a second optical pulse which is synchronous with the first optical pulse and delays a predetermined time for each period of the first optical pulse;

sampling means for receiving the multiplexed light and the second optical pulse to obtain an optical pulse train signal proportional to an intensity of the multiplexed light obtained in synchronism with the second optical pulse; and signal processing means for obtaining, from the optical pulse train signal from said sampling means, an envelope formed by peaks of individual optical pulses forming the optical pulse train, wherein wavelength dispersion of the object is obtained by measuring a delay time of the outgoing optical pulse passing through the object on the basis of intervals between the peaks of the envelope.

2. An apparatus according to claim 1, wherein said sampling means comprises:

a polarization separator for separating each of the multiplexed light and the second optical pulse into two light components having polarization planes that are 90° out of phase, multiplexing two pairs of separated multiplexed light and second optical pulse having polarization planes that are 90° out of phase, and outputting the two pairs of multiplexed light components to different optical paths;

a pair of nonlinear optical materials each capable of phase matching of the second kind by which a cross-correlation signal of the multiplexed light and second output pulse, which are output to a corresponding one of said optical paths and have polarization planes that are 90° out of phase, is generated as sum frequency light;

a pair of photodetectors for converting the output sum frequency light components from said nonlinear optical materials into electrical signals; and an addition circuit for adding the output electrical signals from said photodetectors to output a sum electrical signal as an optical pulse train signal.

3. An apparatus according to claim 1, wherein said sampling means comprises:

a multiplexer for multiplexing the multiplexed light and the second optical pulse with polarization planes 90° out of phase;

a nonlinear optical material capable of phase matching of the second kind by which a cross-correlation signal of the multiplexed light and the second optical pulse, which are output from said multiplexer and have polarization planes that are 90° out of phase, is generated as sum frequency light; and a photodetector for converting the output sum frequency light from said nonlinear optical material into an electrical signal.

4. An apparatus according to claim 1, wherein said sampling means comprises:

a pair of polarization controllers disposed on optical axes of the multiplexed light and the second optical pulse to make polarization planes of the multiplexed light and the second optical pulse parallel to each other;

a lens inserted on optical axes of the multiplexed light and the second optical pulse passing through said polarization controllers to focus the multiplexed light and the second optical pulse to a single point;

a nonlinear optical material disposed on a focal point of said lens and capable of phase matching of the first kind by which a cross-correlation signal of the multiplexed light and the second optical pulse is generated as sum frequency light;

a slit for separating the sum frequency signal generated by said nonlinear optical material, the multiplexed light, and the second optical pulse; and a photodetector for converting the sum frequency signal separated by said slit into an electrical signal.

5. An apparatus according to claim 1, wherein said second pulse light source comprises:

a voltage-controlled oscillator (VCO) for outputting a predetermined signal;

a first frequency divider for reducing a frequency of the reference signal to $1/n_1$;

a second frequency divider for reducing a frequency of the frequency-divided signal from said first frequency divider to $1/n_2$;

a mixer for synthesizing the frequency-divided signal from said first frequency divider and the output signal from said VCO to output a synthetic signal;

a phase comparator for comparing a phase of the frequency-divided signal from said second frequency divider with a phase of the synthetic signal from said mixer to supply a voltage signal corresponding to a frequency difference to said VCO;

a third frequency divider for reducing a frequency of the output signal from said VCO to $1/n_3$; and a short pulse light source driven by the frequency-divided signal from said third frequency divider.

6. A wavelength dispersion measuring apparatus comprising:

a first tunable wavelength pulse light source;

an optical demultiplexer for demultiplexing a first optical pulse emitted from said first pulse light source into a reference optical pulse and an incident optical pulse to be sent into an object to be measured;

an optical multiplexer for multiplexing the reference optical pulse and an outgoing optical pulse passing through the object to output multiplexed light;

a second pulse light source for emitting a second optical pulse synchronous with a repeating frequency of the first optical pulse emitted from said first pulse light source;

spatial optical delay means for changing a relative phase of the second optical pulse with respect to the first optical pulse;

sampling means for receiving the multiplexed light and the output second optical pulse from said optical delay means to obtain, whenever the relative phase of the second optical pulse is changed, a correlation intensity signal proportional to an optical waveform of the multiplexed light in that phase; and signal processing means for obtaining the optical waveform of the multiplexed light from the correlation intensity signal obtained by said sampling means, wherein wavelength dispersion of the object is obtained by measuring a delay time of the outgoing optical pulse passing through the object on the basis of intervals between peaks of the optical waveform of the multiplexed light.

7. An apparatus according to claim 6, wherein said sampling means comprises:

a polarization separator for separating each of the multiplexed light and the second optical pulse into two light components having polarization planes that are 90° out of phase, multiplexing two pairs of separated multiplexed light and second optical pulse having polarization planes that are 90° out of phase, and outputting the two pairs of multiplexed light components to different optical paths;

a pair of nonlinear optical materials each capable of phase matching of the second kind by which a cross-correlation signal of the multiplexed light and second output pulse, which are output to a corresponding one of said optical paths and have polarization planes that are 90° out of phase, is generated as sum frequency light;

a pair of photodetectors for converting the output sum frequency light components from said nonlinear optical materials into electrical signals; and an addition circuit for adding the output electrical signals from said photodetectors to output a sum electrical signal as an optical pulse train signal.

8. An apparatus according to claim 6, wherein said sampling means comprises:

a multiplexer for multiplexing the multiplexed light and the second optical pulse with polarization planes 90° out of phase;

a nonlinear optical material capable of phase matching of the second kind by which a cross-correlation signal of the multiplexed light and the second optical pulse, which are output from said multiplexer and have polarization planes that are 90° out of phase, is generated as sum frequency light; and a photodetector for converting the output sum frequency light from said nonlinear optical material into an electrical signal.

9. An apparatus according to claim 6, characterized in that said sampling means comprises:

a pair of polarization controllers disposed on optical axes of the multiplexed light and the second optical pulse to make polarization planes of the multiplexed light and the second optical pulse parallel to each other;

a lens inserted on optical axes of the multiplexed light and the second optical pulse passing through said polarization controllers to focus the multiplexed light and the second optical pulse to a single point;

a nonlinear optical material disposed on a focal point of said lens and capable of phase matching of the first kind by which a cross-correlation signal of the multiplexed light and the second optical pulse is generated as sum frequency light;

a slit for separating the sum frequency signal generated by said nonlinear optical material, the multiplexed light, and the second optical pulse; and a photodetector for converting the sum frequency signal separated by said slit into an electrical signal.

10. A polarization dispersion measuring apparatus comprising:

a first tunable wavelength pulse light source driven by a reference signal;

an optical demultiplexer for demultiplexing a first optical pulse emitted from said first pulse light source into a reference optical pulse and an incident optical pulse to be sent into an object to be measured;

an analyzer for passing a component in a specific polarization direction of an outgoing optical pulse passing through the object;

an optical multiplexer for multiplexing the reference optical pulse and the outgoing optical pulse passing through the object and said analyzer to output multiplexed light;

a second pulse light source for generating a second optical pulse which is synchronous with the first optical pulse and delays a predetermined time for each period of the first optical pulse;

sampling means for receiving the multiplexed light and the second optical pulse to obtain an optical pulse train signal proportional to an intensity of the multiplexed light obtained in synchronism with the second optical pulse; and signal processing means for obtaining, from the optical pulse train signal from said sampling means, an envelope formed by peaks of individual optical pulses forming the optical pulse train, wherein polarization dispersion of the object is obtained by measuring a delay time of the outgoing optical pulse passing through the object on the basis of intervals between the peaks of the envelope.

11. A polarization dispersion measuring apparatus comprising:

a first tunable wavelength pulse light source;

an optical demultiplexer for demultiplexing a first optical pulse emitted from said first pulse light source into a reference optical pulse and an incident optical pulse to be sent into an object to be measured;

an analyzer for passing a component in a specific polarization direction of an outgoing optical pulse passing through the object;

an optical multiplexer for multiplexing the reference optical pulse and the outgoing optical pulse passing through the object and said analyzer to output multiplexed light;

a second pulse light source for emitting a second optical pulse synchronous with a repeating frequency of the first optical pulse emitted from said first pulse light source;

spatial optical delay means for changing a relative phase of the second optical pulse with respect to the first optical pulse;

sampling means for receiving the multiplexed light and the output second optical pulse from said optical delay means to obtain, whenever the relative phase of the second optical pulse is changed, a correlation intensity signal proportional to an optical waveform of the multiplexed light in that phase; and signal processing means for obtaining the optical waveform of the multiplexed light from the correlation intensity signal obtained by said sampling means, wherein polarization dispersion of the object is obtained by measuring a delay time of the outgoing optical pulse passing through the object on the basis of intervals between peaks of the optical waveform of the multiplexed light.

* * * * *

UNITED STATES PATENT AND TRADEMARK OFFICE
CERTIFICATE OF CORRECTION

PATENT NO.    : 5,995,228
DATED         : November 30, 1999
INVENTOR(S)   : Akihito Otani et al.

It is certified that error appears in the above-identified patent and that said Letters Patent is hereby corrected as shown below:

Item [73] Assignees,
Line 3, change "JPX" to --Japan--.

Signed and Sealed this

Twenty-sixth Day of June, 2001

*Attest:*

*Attesting Officer*

NICHOLAS P. GODICI
*Acting Director of the United States Patent and Trademark Office*